(12) United States Patent
Fouquet et al.

(10) Patent No.: US 7,139,835 B2
(45) Date of Patent: *Nov. 21, 2006

(54) COMMUNICATION NETWORK BASED ON TOPOGRAPHIC NETWORK DEVICES

(75) Inventors: Julie E. Fouquet, Portola Valley, CA (US); Ian Hardcastle, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 876 days.

This patent is subject to a terminal disclaimer.

(21) Appl. No.: 09/915,656

(22) Filed: Jul. 25, 2001

(65) Prior Publication Data

US 2003/0021273 A1    Jan. 30, 2003

(51) Int. Cl.
*G06F 15/173* (2006.01)

(52) U.S. Cl. .................................. 709/238; 709/239
(58) Field of Classification Search ........ 709/220–228, 709/239, 249, 221–224, 245, 238; 701/200, 701/211, 213, 201; 700/291; 455/414, 456, 455/433; 702/9; 482/8; 483/1; 370/360, 370/422, 392; 340/995, 825; 710/316; 379/219
See application file for complete search history.

(56) References Cited

U.S. PATENT DOCUMENTS

| | | | | |
|---|---|---|---|---|
| 5,140,523 A | * | 8/1992 | Frankel et al. ................ 702/4 |
| 5,166,878 A | * | 11/1992 | Poelstra ...................... 701/200 |
| 5,841,775 A | * | 11/1998 | Huang ........................ 370/422 |
| 5,845,203 A | * | 12/1998 | LaDue ...................... 455/414.1 |
| 5,848,373 A | * | 12/1998 | DeLorme et al. .......... 701/200 |
| 5,908,465 A | * | 6/1999 | Ito et al. ..................... 701/211 |
| 5,983,269 A | * | 11/1999 | Mattson et al. ............. 709/221 |
| 6,091,956 A | * | 7/2000 | Hollenberg ............... 455/456.5 |
| 6,144,318 A | * | 11/2000 | Hayashi et al. ......... 340/995.19 |
| 6,202,023 B1 | * | 3/2001 | Hancock et al. ............ 701/201 |

(Continued)

OTHER PUBLICATIONS

Toward Work-Centered Digital Information Services—Wilensky (1996) http.cs.berkeley.edu/~wilensky/computer-special-issue.ps.gz.*

(Continued)

*Primary Examiner*—Thong Vu

(57) ABSTRACT

The network comprises topographic network devices and communication links interconnecting the topographic network devices. The topographic network devices each have a physical location represented by a topographic coordinate set, and a network address that includes the topographic coordinate set. A message configured for transmission through the network includes a destination coordinate set, which is the topographic coordinate set of a destination network device that is one of the topographic network devices. A topographic network device comprises channels, a coordinate store and a topographic processor. The channels are each configured for connection via a communication link to another of the topographic network devices. The channels include a first channel via which the message is received. The coordinate store stores connected device coordinate sets, which are the topographic coordinate sets of the topographic network devices to which the channels are directly connected. The topographic processor operates in response to the connected device coordinate sets and the destination coordinate set of the message to identify a second channel of the topographic network device to which to forward the message.

37 Claims, 14 Drawing Sheets

U.S. PATENT DOCUMENTS

| | | | | |
|---|---|---|---|---|
| 6,240,425 | B1 * | 5/2001 | Naughton | 707/104.1 |
| 6,389,360 | B1 * | 5/2002 | Alft et al. | 702/9 |
| 6,447,424 | B1 * | 9/2002 | Ashby et al. | 482/8 |
| 6,553,310 | B1 * | 4/2003 | Lopke | 701/213 |
| 6,618,648 | B1 * | 9/2003 | Shirota et al. | 700/291 |
| 6,659,861 | B1 * | 12/2003 | Faris et al. | 463/1 |
| 6,661,884 | B1 * | 12/2003 | Shaffer et al. | 379/201.02 |
| 6,703,947 | B1 * | 3/2004 | Wallner | 341/50 |
| 6,748,213 | B1 * | 6/2004 | Kim | 455/433 |
| 6,771,970 | B1 * | 8/2004 | Dan | 455/456.1 |
| 2001/0032271 | A1 * | 10/2001 | Allen | 709/239 |
| 2002/0002622 | A1 * | 1/2002 | Vange et al. | 709/245 |
| 2002/0075862 | A1 * | 6/2002 | Mayes | 370/360 |
| 2002/0178255 | A1 * | 11/2002 | Hobart | 709/224 |
| 2002/0184354 | A1 * | 12/2002 | McKenzie et al. | 709/223 |
| 2003/0023747 | A1 * | 1/2003 | Fouquet et al. | 709/238 |

OTHER PUBLICATIONS

Automatic Control Point Measurement—Michael Hahn Stuttgart (1997) www.ifp.uni-stuttgart.de/publications/1997/../phowo97/hahn.pdf.*

Crustal Deformation Measurments Using Repeat-pass 1 SAR Near . . . —Paul Rosen Jet (1998). techreports.jpl.nasa.gov/1997/97-1425.pdf.*

A Location Service for Worldwide Distributed Objects—Hauck, van Steen, Tanenbaum (1997) www4.informatik.uni-erlangen.de/~fzhauck/Pub/Doc/1997-wmrpos.ps.gz.*

Shadow Targets: A Novel Algorithm For Topographic Projections . . . —Tipping, Lowe (1997) ftp.research.microsoft.com/users/mtipping/iee97_st.ps.gz.*

Feed-Forward Neural Networks and Topographic Mappings for . . . —Lowe, Tipping (1996) ftp.research.microsoft.com/users/mtipping/ncaf.ps.gz.*

Segmentation of text from color map images Tofani, P.; Kasturi, R.; Pattern Recognition, 1998. Proceedings. Fourteenth International Conference on vol. 1, Aug. 16-20, 1998 pp. 945-947 vol. 1.*

Feed-Forward Neural Networks and Topographic Mappings for . . . 13 Lowe, Tipping (1996) ftp.research.microsoft.com/users/mtipping/ncaf.ps.gz.*

Automated Updating Of Road Information From Aerial Images—Fortier, Ziou, Armenakis . . . (2000) (Correct) (1 citation) www-l2ti.univ-paris13.fr/~auc.*

Dimensionality Reduction by Sparsification in a Local-Features . . . —Penev (1999) (Correct) venezia.rockefeller.edu/penev/NIPS99/reduce-submit.ps.gz.*

* cited by examiner

COMMUNICATION NETWORK BASED ON TOPOGRAPHIC NETWORK DEVICES

RELATED DISCLOSURE

This disclosure is related to the simultaneously-filed disclosure entitled Method for Establishing a Communication Network Based on Topographic Network Devices and for Transmitting a Message Through Same of inventors Julie E. Fouquet and Ian Hardcastle Ser. No. 09/915,934 and that is incorporated herein by reference.

BACKGROUND OF THE INVENTION

The main elements of networks for communicating sets of information data are network devices and communication links. The network devices include end-user devices and routers. Routers control the flow of data traffic in the network, between networks and between the network and the end-user devices. Basic information on routers and their use in networks is disclosed by Radia Perlman in the book entitled INTERCONNECTIONS, the second edition of which was published by Addison-Wesley in 1999.

Messages containing information are transmitted through the network in data sets known in the art by such names as packets, frames, cells and protocol data units. In this disclosure, the term packet will be used to describe such data sets. Each packet includes a header that includes a destination address. Each router has a number of channels through each of which the router receives messages from, and transmits messages to, the network device connected by a communication link to the channel. The router typically transmits messages onward through the network via a different channel from the one through which the messages were received.

The router channel to which a given message is sent for transmission is determined by the destination address in the headers of the packets in which the message is contained, and additionally from address information stored in an address table that forms part of the router. The address table is hierarchical and stores address information relating to the network or end-user device connected to each channel of the router. The address information is detailed with respect to the domains of end-user devices connected to the channels and is more general with respect to networks connected to the channels. Specifically, the address information indicates what is connected to each of the channels of the router. For example, the address information might indicate that a packet with a given destination address should be sent through the router to channel n for onward transmission. When the router determines the channel to which to send a packet, there is no guarantee that the channel is connected to a network device that is any closer to the destination of the packet than the router itself.

The conventional network architecture described above works well in many ways. However, it can be inefficient and can result in messages being delayed. Delays are undesirable, and are especially so in new applications such as video streaming and Voice over Internet. With the conventional routing scheme, messages may cross the continent several times and may pass through many routers before reaching their final destination. Before transmitting a message to another network device, each router may store all or part of the message for a storage time that depends on network traffic. The storage time may become very long as the network traffic approaches saturation. This increases the likelihood for messages to be delayed unacceptably, especially at times of high traffic.

Thus, what is needed is a network in which messages are transmitted to their destination by a route that is more direct that the route that typically results from the conventional routing scheme described above. A more direct routing can potentially reduce the number of routers that the message passes through on its way to its destination and, hence, the potential for the message being delayed.

SUMMARY OF THE INVENTION

The invention provides a network for communicating a message. The network comprises topographic network devices and communication links interconnecting the topographic network devices. The topographic network devices each have a physical location represented by a topographic coordinate set, and a network address that includes the topographic coordinate set.

The message may include the topographic coordinate set of a destination network device as a destination coordinate set. The destination network device is one of the topographic network devices. One of the topographic network devices, an intermediate network device, upon receiving the message, operates to route the message to another of the topographic network devices. The other of the network devices is physically closer to the destination network device than the intermediate topographic network device.

The network may additionally comprise additional network devices and additional communication links. The additional communication links connect the additional network devices to some of the topographic network devices. The additional network devices have conventional network addresses that lack topographic coordinate sets.

The network may include regions, each of which comprises at least one regional network device that is one of the topographic network devices. The regional network devices are interconnected by high-capacity communication links. In this case, the topographic network devices in region each include additional topographic information indicating the topographic coordinate set of the regional network device of the region and the topographic extent of at least some of the regions. A topographic network device, upon receiving the message, operates in response to the destination coordinate set and the additional topographic information to route the message to the regional network device when the additional topographic information indicates that the destination network device is located in another region.

The invention also provides a topographic network device for operation in the above-described network. A message configured for transmission through the network includes a destination coordinate set, which is the topographic coordinate set of a destination network device. The destination network device is one of the topographic network devices. The topographic network device comprises channels, a coordinate store and a topographic processor. The channels are each configured for connection via a communication link to another of the topographic network devices. The channels include a first channel via which the message is received. The coordinate store stores connected device coordinate sets, which are the topographic coordinate sets of the topographic network devices to which the channels are directly connected. The topographic processor operates in response to the connected device coordinate sets stored in the coordinate store and the destination coordinate set of the message to identify a second channel to which to forward the message. The second channel is another of the channels of the topographic network device.

The coordinate store may additionally be configured to store either or both of device-type information and additional topographic information for those of the topographic network devices directly connected to the network device. In this case, the topographic processor may additionally operate in response to either or both of the device-type information and the additional topographic information to identify the second channel.

The coordinate store may additionally be configured to store additional topographic information relating to the network, and the topographic processor may operate in response to the additional topographic information instead of the destination coordinate set of the message to identify the second channel.

The network may additionally comprise additional network devices and additional communication links. The additional communication links connect the additional network devices to at least some of the topographic network devices. The additional network devices have conventional network addresses that lack topographic coordinate sets, and include a destination network device. In this case, the message includes, instead of the destination coordinate set, a destination network address that identifies the destination network device and that lacks a topographic coordinate set. The topographic network device may additionally comprise a topographic translator that operates on receipt of the message and in response to the destination network address to provide the topographic coordinate set of another of the topographic network devices as the destination coordinate set for the message. In this case, the topographic processor operates in response to the destination coordinate set provided by the topographic translator.

Finally, the invention provides a computer-readable medium in which is fixed a computer program that instructs a computer to perform a topographic network message addressing method. In the addressing method, an original message is received and a determination is made of whether a valid topographic reply-to field exists in the original message. The valid topographical reply-to field includes a topographic coordinate set. When the valid topographic reply-to field exists in the original message, a reply message that includes a destination coordinate set field is created in response to the original message, and the topographic coordinate set is copied from the topographic reply-to field of the original message to the destination coordinate set field of the reply message.

In the network according to the invention, topographic network devices according to the invention each have a network address that includes a coordinate set indicating the physical location of the topographic network device. Messages are routed from a source network device towards a destination network device. The messages include a destination coordinate set that may be inserted into the message by the source network device or by another of the network devices. The messages are routed through topographic network devices known from their respective topographic coordinate sets to be located progressively closer to the destination network device. As a result, messages are transmitted to their destination by a route that is more direct that the route that typically results from the conventional routing scheme described above. Moreover, the more direct routing will often result in the message passing through fewer routers. A more direct routing and a reduction in the number of routers through which the message passes on its way to its destination reduce the potential for the message being delayed.

The computer program stored in the computer-readable medium according to the invention enables conventional, non-topographic network devices to be easily modified to generate a topographically-addressed reply message in response to a received message that includes a topographic reply-to address.

DETAILED DESCRIPTION OF THE INVENTION

Figure 1:
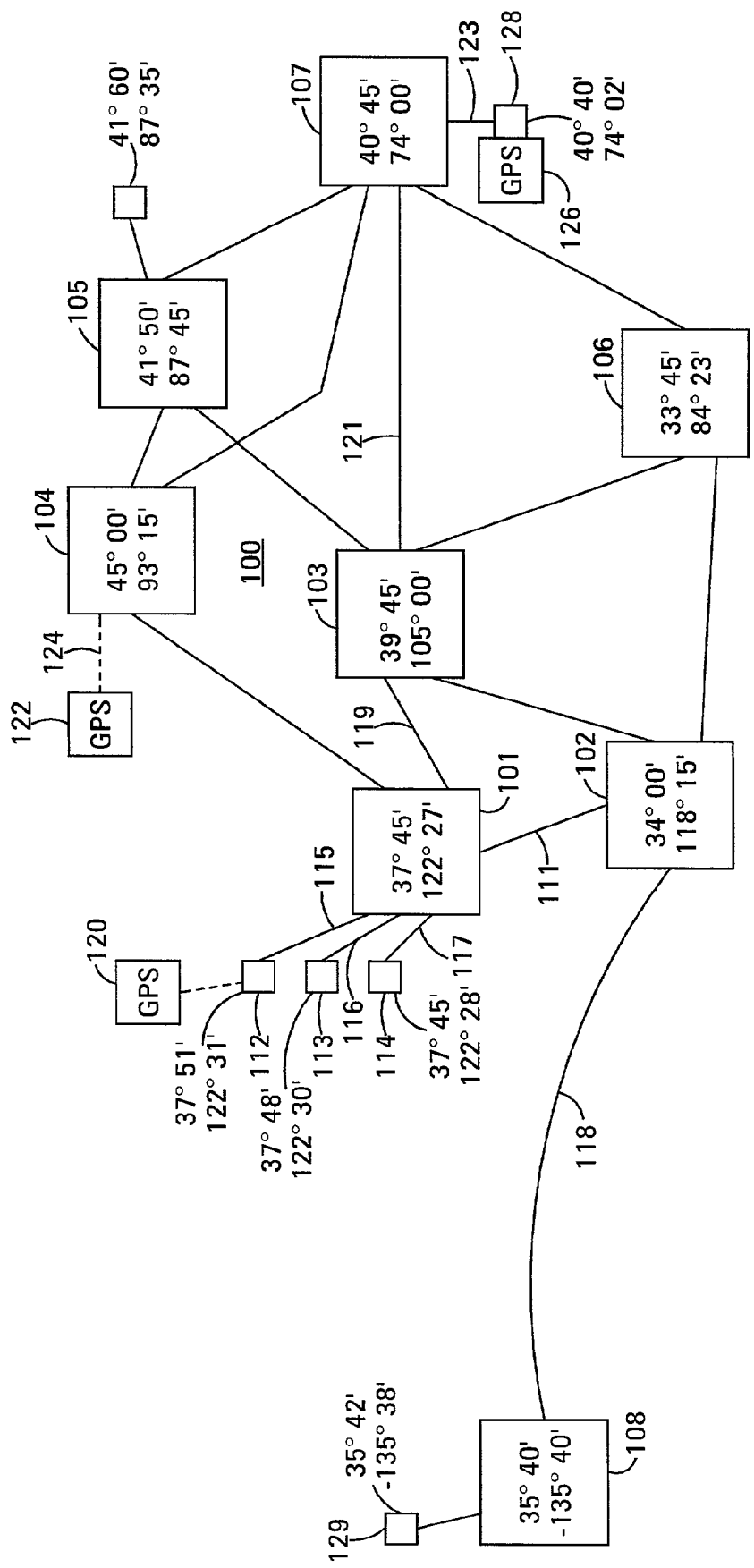
FIG. 1 is a schematic diagram of a highly simplified example of a first embodiment of a network according to the invention.

FIG. 1 is a schematic diagram of a highly simplified example of a first embodiment 100 of a network according to the invention for communicating messages. In the example shown, the network 100 is a wide-area network covering the 48 contiguous states of the United States and part of Asia. The network is composed of topographic network devices interconnected by communication links. Optical fibers, electrical cables and terrestrial or satellite R.F. or microwave links are examples of communication links. The topographic network devices include routers and end-user devices. In the highly-simplified example shown, the network 100 is composed of the routers 101–108 and the end-user devices 112–114 and 128 interconnected by several communication links as shown. In particular, the routers 101 and 102 are connected by the communication link 111, and the end-user devices 112–114 are connected to the router 101 by the communication links 115–117, respectively. Network devices located at opposite ends of a communication link will be said to be directly connected. For example, the routers 101 and 102 are directly connected by the communication link 111, and the end-user device 112 and the router 101 are directly connected by the communication link 115. The end-user device 112 is not directly connected to the router 102. Most, if not all, of the end-user devices that would normally be connected to the routers 101–108 have been omitted to simplify the drawing further.

Each topographic network device of the network 100 has a network address that includes the topographic coordinate set of the topographic network device. In the exemplary wide-area network shown in FIG. 1, the network address of each topographic network device includes a geographic coordinate set composed of the latitude and longitude (degrees North, degrees West) of the global location of the network device. In this example, network devices located in the Southern hemisphere (not shown) have negative latitudes and those located in the Eastern hemisphere, for example, the network device 108, have negative longitudes. Alternatively, 90 degrees can be added to all latitudes and 180 degrees can be added to all longitudes to eliminate the negative numbers.

FIG. 1 shows the latitudes and longitudes with a resolution of one minute, for simplicity. The resolution of the latitude and longitude in a practical embodiment of the network 100 would depend on the maximum number of network devices in the network and the closest angular separation of the network devices. For example, in a practical embodiment, the latitude and longitude could have a resolution of a fraction of a second.

Topographical coordinate sets composed of other geographic or topographic coordinates may be used instead of the latitude/longitude geographic coordinate sets shown. For example, a topographic network device in a local area network installed in a single-story building can have a two-dimensional Cartesian coordinate set (x, y) as the topographic coordinate set in its network address. A topographic network device in a local area network installed in a multi-story building can have a three-dimensional Cartesian coordinate set (x, y, z) as the topographic coordinate set in its network address. The term topographic coordinate set as used in this disclosure will be understood to encompass such alternatives.

The topographic coordinate sets of topographic network devices that have substantially coincident physical locations in the topographic coordinate system can each include an additional numeric or other field that distinguishes such topographic network devices from one another.

Each topographic network device of the network 100 is configured to receive its own topographic coordinate set, and to transmit its topographic coordinate set to each of at least the routers directly connected to it. In an embodiment, the each topographic network devices is configured to transmit its own topographic coordinate set to each of the topographic network devices directly connected to it. Each of the topographic network devices that is a router is additionally configured to receive and store the topographic coordinate set of each of the topographic network devices directly connected to it. The router stores each topographic coordinate set it receives as a connected device coordinate set. Each connected device coordinate set is stored in a way that links it to the channel address of the channel through which the router received it. Additionally, each topographic network device may optionally store its own topographic coordinate set.

For example, after receiving its own topographic coordinate set, the router 101 transmits its topographic coordinate set to the end-user devices 112–114 and to the routers 102–104 directly connected to it. Each of the routers 102–104 receiving the topographic coordinate set from the router 101 stores the topographic coordinate set of the router 101 as a connected device coordinate set linked to the channel address of the channel connected to the router 101. The end-user devices 112–114 receiving the topographic coordinate set from the router 101 need not store the topographic coordinate set since each of the end-user devices 112–114 is connected exclusively to the router 101.

In response to receiving the topographic coordinate set from the router 101, each of the end-user devices 112–114 and each of the routers 102–104 transmits its own topographic coordinate set to the router 101. The router 101 receives the topographic coordinate sets from the end-user devices 112–114 and the routers 102–104, and stores each received topographic coordinate set as a respective connected device coordinate set. The router 101 stores the connected device coordinate sets linked to the channel address of the channel through which the corresponding topographic coordinate set was received.

Each topographic network device is configured to transmit its own topographic coordinate set at least when it is newly installed in the network. This informs all the topographic network devices directly connected to the topographic network device of the topographic coordinate set of the topographic network device. Each topographic network device is additionally configured to transmit its topographic coordinate set in response to receiving a topographic coordinate set from another topographic network device directly connected to it. This enables the topographic network device to inform the topographic network device from which it received the topographic coordinate set of its own topographic coordinate set. In response to receiving a topographic coordinate set from another topographic network device, the topographic network device may transmit its topographic coordinate set to all the topographic network devices directly connected to it, or may transmit its topographic coordinate set only to the other topographic network device.

Following the exchange of topographic coordinate sets, each router in the network 100 knows the topographic coordinate sets of all the topographic network devices directly connected to it. Additionally, each end-user device may also know the topographic coordinate set of the router to which it is connected, although this is not critical to the invention. Including the topographic coordinate set in the network address of the topographic network device reduces the number of data that need to be stored in the routers in the network 100 according to the invention compared with the number of data stored in the routing tables of conventional routers. The topographic coordinate sets enable the routers of the network 100 to determine the routing of a message using simple topographical algorithms.

Sets of information data, which will be referred to in this disclosure as messages, pass through the network 100. Examples of a message include an e-mail message, a request for the contents of a web page and the web page contents returned in response to the request. Each message originates at one of the topographic network devices, which will be called the source network device, and passes through the network to another of the topographic network devices, which will be called the destination network device. In passing through the network, the message passes through one or more of the topographic network devices, each of which will be called an intermediate network device. Each intermediate network device performs a routing operation in which the topographic network device to which the message will be forwarded is identified. The topographic network device identified is either the destination network device or another intermediate network device.

The message is composed of one or more data sets known in the art by such names as packets, frames, cells and protocol data units. In this disclosure, the term packet will be used to describe such data sets. Each packet includes a header that includes additional data relating to the packet. The additional data include a destination address that will be called a destination coordinate set. In the network 100, the destination coordinate set is composed of the topographic coordinate set of the destination network device.

In the following example, the source network device is the end-user device 112 and the destination network device is the end-user device 128. To send a message to a given destination network device, the source network device determines the topographic coordinate set of the destination device, and inserts the topographic coordinate set of the destination device as a destination coordinate set into the header of each packet in which the message is contained. To determine the destination coordinate set of the destination network device, the source network device may include a look-up table that includes a cross-reference between the real-world names of potential destination end-users and the topographic coordinate sets of their end-user devices. The header of at least one packet of the message may additionally include the topographic coordinate set of the source network device.

In the following description, it will be assumed that the message is contained in a single packet. The end-user device 112 automatically transmits the packet to the router 101 via the communication link 115. The router 101 receives the packet and reads the destination coordinate set in the packet header. The router 101 then uses the destination coordinate set and the connected device coordinate sets stored in the router 101 to identify the one of its channels to which it will send the packet for onward transmission. The channel identified is that directly connected to one of the topographic network devices that is physically closer to the destination network device than the router 101. In an embodiment, the channel identified is that directly connected to the topographic network device that is physically closest to the destination network device. In this example, the topographic network device that is physically closest to the destination network device is the router 103.

The router 101 may perform topographical calculations to identify the channel directly connected to one of the topographic network devices that is physically closer to the destination network device than the router 101. Alternatively, the router 101 may employ a look-up table or other suitable processing.

The packet passes through the router 101 to the identified channel. In this example, the identified channel is the channel directly connected to the router 103. The channel transmits the packet to the router 103 via the communication link 119.

At the router 103, a process similar to that just described takes place, and the router 103 identifies one of its channels that is directly connected to one of the topographic network devices that is physically closer to the destination network device than the router 103. In an embodiment, the channel identified is the channel directly connected to the topographic network device that is physically closest to the destination network device. In this example, the topographic network device that is physically closest to the destination network device is the router 107, and the router 103 transmits the message to the router 107 via the communication link 121.

At the router 107, a similar process to that just described takes place, and the router 107 identifies the one of its channels directly connected to end-user device 128 as the channel directly connected to the topographic network device that is physically closer to the destination network device than the router 107. In this case, the topographic network device that is physically closer to the destination network device than the router 107 is the destination network device itself, i.e., the end-user device 128. The router 107 transmits the message to the end-user device 128 via the communication link 123. In the above-described message routing, the routers 101, 103 and 107 are the intermediate network devices through which the message passes on its journey through the network 100 between the source network device and the destination network device.

Figure 2:
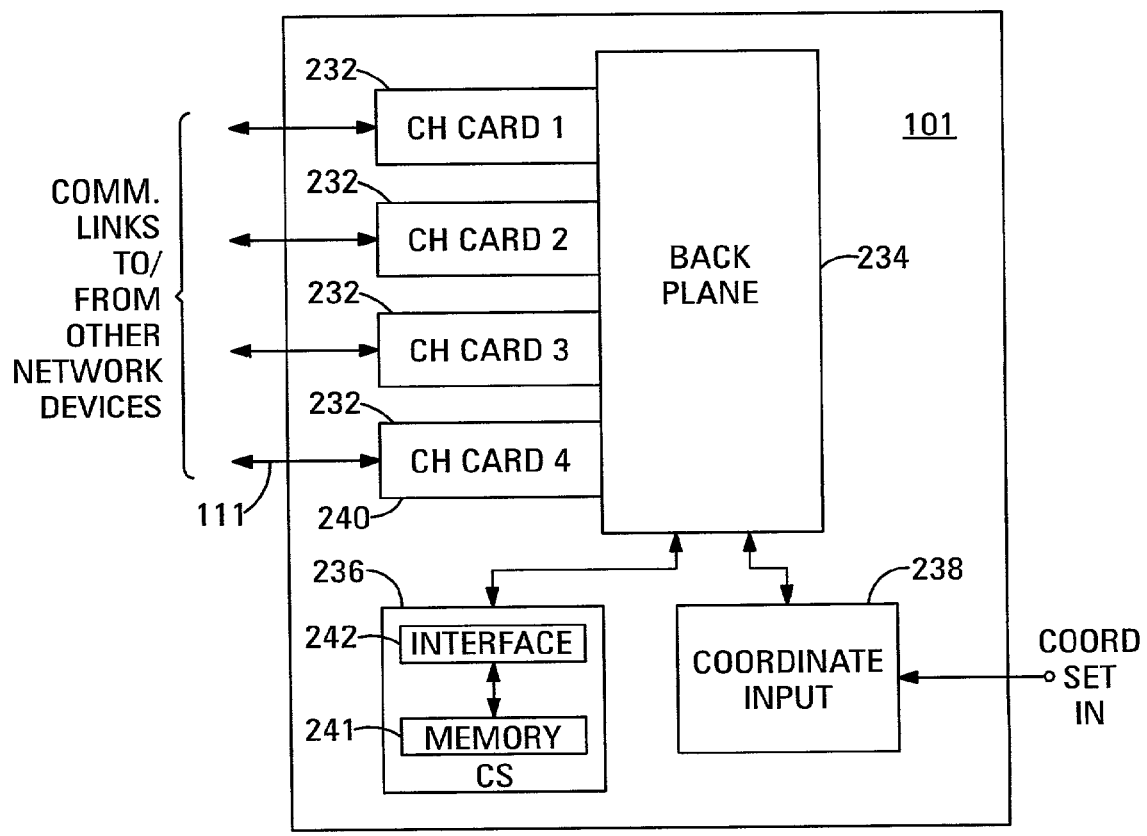
FIG. 2 is a block diagram of an exemplary embodiment of a topographic router according to the invention.

FIG. 2 is a block diagram of an exemplary embodiment of the router 101 as an example of the routers 101–108 constituting the network 100. The remaining routers are similar. The router 101 is composed of one or more channel cards 232 connected to the back plane 234, and additionally includes the coordinate store 236 and the optional coordinate input module 238. A simple embodiment of the router 101 may lack channel cards, and the circuits described below as constituting the router 101 may all be located on a single printed circuit board.

The channel cards 232 typically include more than one channel (not shown). Each channel is allocated a channel address, which is internal to the router 101. Each channel is directly connected by a communication link to another of the topographic network devices, and receives a data stream from, and transmits packets of data to, the other topographic network device via the communication link. The embodiment shown in FIG. 2 is simplified to the extent that each channel card is shown as including only one channel. The channel on the exemplary channel card 240 is directly connected by the communication link 111 to a channel (not shown) of the router 102 (FIG. 1).

The channel cards 232 additionally receive packets of data from, and transmit packets of data to, the backplane 234. The packets of data transmitted to or from the backplane differ from those transmitted to and received from the other topographic network devices and will be called envelopes to distinguish them.

The backplane 234 sends each envelope it receives from any one of the channel cards 232 to a specific channel of any one of the channel cards. The channel to which the backplane is to send the envelope is indicated by a destination channel address included in the header of the envelope. The channel card determines the destination channel address using the destination coordinate set and the connected device coordinate sets stored in the router 101. The destination coordinate set is the topographic coordinate set of the destination network device and is included in the header of each packet in which the message is contained. This process be described in more detail below.

The coordinate store 236 and the optional coordinate input module 238 are shown connected to the backplane 234, and may additionally be located on the backplane.

The coordinate store 236 includes the memory 241 and the memory 242. The memory stores the connected device coordinate sets received by the router 101. The memory is preferably a rewritable, non-volatile memory such as a EPROM or a flash memory. Non-volatile memory extant on the backplane 234 may be shared between the coordinate store and other memory functions of the router 101.

The interface 241 transfers topographic coordinate sets from the backplane 234 into the memory 242 and transfers connected device coordinate sets from the memory to the backplane.

In the coordinate store 236, the memory 241 includes a number of fields, each of which stores one of the topographic coordinate sets received by the router 101 as a respective connected device coordinate set. Each connected device coordinate set is linked to the channel address of the channel through which the router 101 received the respective topographic coordinate set. For example, each field may additionally store the channel address of the channel through which the router 101 received the topographic coordinate set corresponding to the connected device coordinate set. Alternatively, the channel address may be used as the address of the field. In this case, each connected device coordinate set is stored in the field whose field address is the channel address of the channel through which the router 101 received the corresponding topographic coordinate set. The coordinate store may additionally store the topographic coordinate set of the router 101.

In an embodiment, the interface 242 of the coordinate store 236 is configured as a channel card interface. The channel card interface is electrically connected to the back plane 234 in the same way as the channel cards 232 and is allocated a channel address. As a result, the coordinate store 236 appears to the backplane 234 as an additional channel of the router 101. The coordinate store accepts topographic coordinate sets from, and sends connected device coordinate sets to, the channels of the router via the channel card interface. The topographic coordinate sets and the connected device coordinate sets are packaged in packets that are enclosed in envelopes. Envelopes sent by the channels to the coordinate store are addressed to the channel address of the coordinate store. Envelopes sent by the coordinate store to a channel are addressed to the channel address of the channel.

The channel card interface 242 removes the packets from the envelopes it receives, extracts the topographic coordinate sets from the packets and stores them in the memory 241 as corresponding connected device coordinate sets. Additionally, the channel card interface receives connected device coordinate sets read from the memory, packages the connected device coordinate sets in packets and encloses the packets in envelopes addressed to one or more of the channels. The channel card interface sends the envelopes through the backplane 234 to the channels to which they are addressed.

As noted above, the router 101 may include the coordinate input module 238 through which the router receives its own topographic coordinate set. Typically, the coordinate input module receives the topographic coordinate set of the router 101 shortly after the router 101 has been installed in the network 100. The coordinate input module inserts the topographic coordinate set into packets that have no destination address but that are identified as topographic coordinate packets. The coordinate input module encloses each topographic coordinate packet in an envelope each addressed to a different one of the channels of the router 101 and sends the envelopes to the backplane 234. Each envelope passes through the backplane to the channel to which it is addressed.

In each channel of the router 101, the topographic coordinate packet is removed from its envelope and is transmitted through the communication link to the topographic network device directly connected to the channel. Thus, the topographic network device connected to the channel receives a topographic coordinate packet containing the topographic coordinate set of the router 101. For example, the router 102 connected to the channel on the channel card 240 receives a topographic coordinate packet containing the topographic coordinate set of the router 101 via the communication link 111.

When each of the topographic network devices connected to the router 101 receives a packet identified as a topographic coordinate packet, the topographic network device stores the topographic coordinate set included in the packet in its coordinate store. Additionally, in response to receiving the topographic coordinate packet, the topographic network device operates as just described to transmit a topographic coordinate packet containing its own topographic coordinate set back to the router 101.

The router 101 receives the topographic coordinate packet from the topographic network device via the one of its channels directly connected to the topographic network device. For example, the router 101 receives a topographic coordinate packet containing the topographic coordinate set of the router 102 via the channel on the channel card 240 connected to the router 102 by the communication link 111. The channel recognizes the packet as a topographic coordinate packet, and encloses the packet in an envelope addressed to the coordinate store 236. The envelope passes through the backplane 234 to the coordinate store. The coordinate store reads the envelope header of the envelope to determine the channel address of the channel that sent the envelope. The coordinate store removes the topographic coordinate packet from its envelope, extracts the topographic coordinate set from the packet and stores the topographic coordinate set in one of the fields of the memory 241 as a connected device coordinate set. The field in which the topographic coordinate set is stored as a connected device coordinate set may be the field indicated by the channel address. Alternatively, the topographic coordinate set may be stored in the memory as a connected device coordinate set linked to the channel address.

Thus, shortly after the router 101 is installed in the network 100, the router is provided with its own topographic coordinate set and transmits a topographic coordinate packet containing its topographic coordinate set to each of the topographic network devices directly connected to it. In response, the router 100 receives a topographic coordinate packet from each of the topographic network devices directly connected to it and stores the topographic coordinate set included in each topographic coordinate packet in its coordinate store as a connected device coordinate set. The connected device coordinate sets stored in the router 101 inform the router 101 of the physical locations of the topographic network devices directly connected to it, and hence allow the router 101 to route messages through the network 100.

The coordinate input module 238 is shown in FIG. 2 as being independently connected to the back plane 234. The coordinate input module may be configured to appear to the backplane as an additional channel of the router 101. Alternatively, the coordinate input module may be connected to the backplane via the interface 242 of the coordinate store 236. In this case, the coordinate input module shares the interface 242 with the memory 241.

Figure 3:
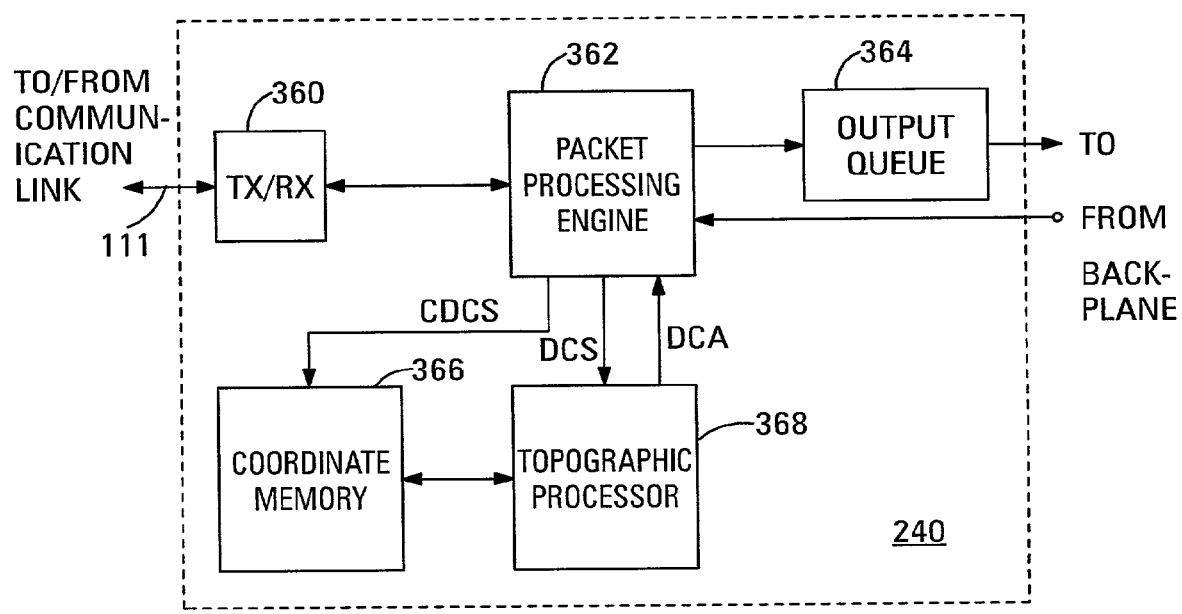
FIG. 3 is a block diagram of an exemplary embodiment of one of the channel cards of the topographic router shown in FIG. 2.

FIG. 3 is a block diagram of an exemplary embodiment of the channel card 240, which is one of the channel cards 232 of the router 101 shown in FIG. 2. The remaining channel cards are similar. The channel card is composed of the transmitter/receiver (TX/RX) 360, the packet processing engine (PACKET PROCESSING ENGINE) 362, the output queue 364, the coordinate memory 366 and the topographic processor 368. The channel card 240 may include more than one transmitter/receiver similar to the transmitter/receiver 360 connected to the packet processing engine, in which case, the channel card 240 handles more than one channel. In some applications, the transmitter/receiver may be a transmitter only or a receiver only. The terms transmitter/receiver and TX/RX will be understood to encompass a transmitter, a receiver and a transmitter/receiver.

The transmitter/receiver 360 receives a data stream from the communication link 111 and transmits the data stream to the PACKET PROCESSING ENGINE 362. In addition, the transmitter/receiver receives packets of data from the PACKET PROCESSING ENGINE and transmits them to the communication link.

The coordinate memory 366 stores a copy of the store contents of the coordinate store 236 (FIG. 2). These contents include the connected device coordinate sets of the topographic network devices directly connected to the router 101 and the channel addresses of the channels to which each of the topographic network devices is connected. The store contents are copied from the coordinate store to the coordinate memory via the backplane 234 and the PACKET PROCESSING ENGINE 362. For example, the coordinate store may package a copy of the store contents in an envelope addressed to one of the channels on the channel card 240. The envelope then passes through the backplane 234 to the PACKET PROCESSING ENGINE 362. The PACKET PROCESSING ENGINE extracts the store contents copy from the envelope and stores it in the coordinate memory. The copies of the connected device coordinate sets may be stored the coordinate memory at memory addresses corresponding to the channel addresses respectively linked to the connected device coordinate sets.

When a message is received by the channel card 240, the PACKET PROCESSING ENGINE 362 performs a framing operation on the data stream received from the transmitter/receiver 360 to determine the boundaries of the packets. Once it has determined the boundaries of the packets, the PACKET PROCESSING ENGINE performs a header read operation to read the header of each packet. The header includes the topographic coordinate set of the destination network device, i.e., the destination coordinate set, that is read by the header read operation.

The PACKET PROCESSING ENGINE 362 feeds a copy of the destination coordinate set DESTINATION COORDINATE SET to the topographic processor 368. The topographic processor uses the destination coordinate set received from the PACKET PROCESSING ENGINE and the connected device coordinate sets stored in the coordinate memory 366 to determine a destination channel address DCA. The destination channel address is the channel address of the channel of the router 101 that is directly connected to one of the topographic network devices that is physically closer to the destination network device than the router 101.

The topographic processor 368 may first examine the connected device coordinate sets to determine whether any of them is identical to the destination coordinate set. In this case, the destination network device is directly connected to the router 101, and the topographic processor returns the address of the channel connected to the destination network device as the destination channel address. If no identity is found, the topographic processor may determine a distance between the router 101 and the destination network device and may additionally determine a distance between the destination network device and each of the topographic network devices connected to the router 101. The topographic processor may calculate a distance for each topographic network device connected to the router 101 in a predetermined order, and may stop the calculation process when a distance less than the distance between the router 101 and the destination network device is found. The topographic processor returns the channel address of the channel connected to the topographic network device that is closer to the topographic network device than the router 101 as the destination channel address DCA.

In an embodiment, the topographic processor 368 determines a distance between the destination network device and the topographic network device for each of the topographic network devices connected to the router 101. The topographic processor examines the distances it has calculated to identify the smallest distance, and returns the channel address of the channel connected to the topographic network device having the smallest distance as the destination channel address DCA. In this case, the destination channel address is the channel address of the channel that is directly connected to the one of the topographic network devices that is physically closest to the destination network device.

To determine the distances as just described, the topographic processor 368 may perform topological calculations using the destination coordinate set and the connected device coordinate sets. An additional distance calculation may be performed using the destination coordinate set and the topographic coordinate set of the router 101. Algorithms for determining the distance between two points with defined topographic coordinates are known in the art, and will not be described here. Alternatively, the topographic processor may employ a look-up table or other suitable processing.

The PACKET PROCESSING ENGINE 362 inserts the packet whose header has just been read into one or more envelopes suitable for sending through the router 101. As noted above, the envelopes may be packet-like structures having a fixed length. The PACKET PROCESSING ENGINE inserts the destination channel address DCA received from the topographic processor into the header of each envelope and sends the envelope to the back plane 234 (FIG. 2). The envelope passes via the back plane to the destination channel, i.e., the channel of the router 101 identified by the destination channel address.

In the destination channel, a PACKET PROCESSING ENGINE similar to the PACKET PROCESSING ENGINE 362 extracts the packets from their respective envelopes and feeds them to a transmitter/receiver similar to the transmitter/receiver 360. The transmitter/receiver transmits the packets via a communication link to the topographic network device at the remote end of the communication link. The packets may be stored in a transmit queue (not shown) prior to transmission.

Substantially fewer data need to be stored in the routers in the network 100 according to the invention than are stored in the large routing tables of the routers in conventional networks. The routers of the network according to the invention can determine topographical routings using simple topographic algorithms. Moreover, the message travels to the destination network device by a simpler, more direct route in which the message passes through fewer topographic network devices. Thus, the potential for the message to be delayed is reduced.

Figure 4:
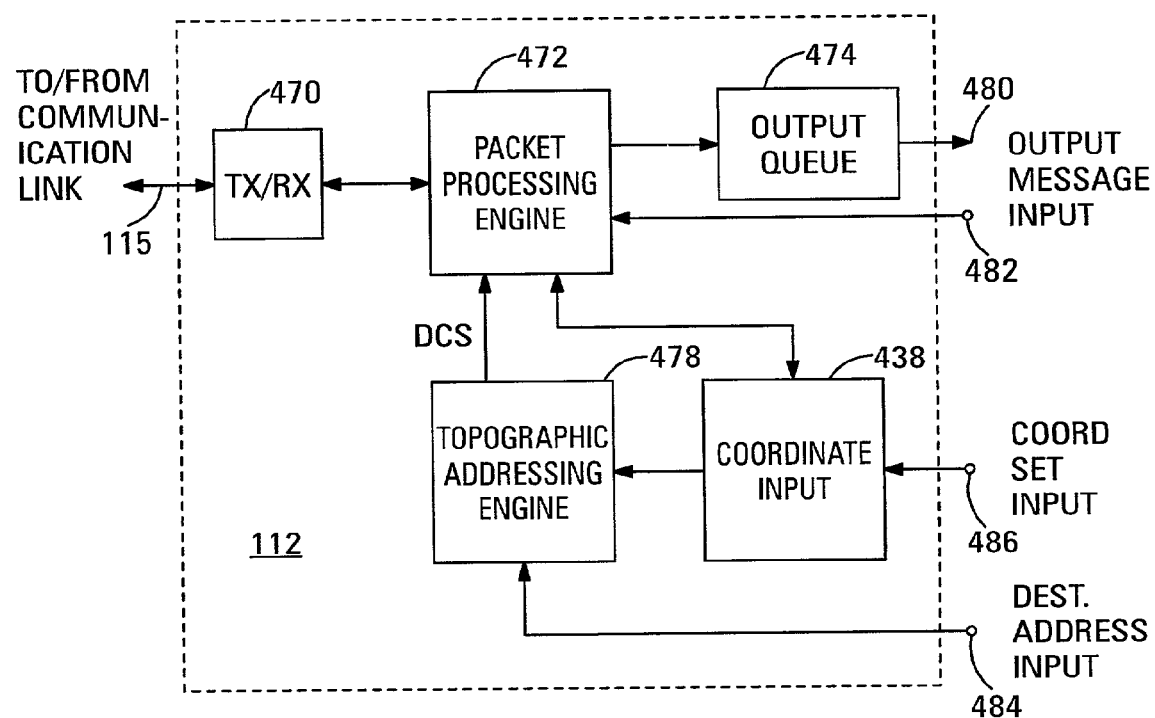
FIG. 4 is a block diagram of an exemplary embodiment of one of the end-user devices of the network shown in FIG. 1.

FIG. 4 is a block diagram of an example of the structure of the end-user device 112 of the network 100. The end-user device may take the physical form of a network card located in a host device (not shown), such as a computer. The other end-user devices of the network may have a similar structure. The end-user device 112 is composed of the transmitter/receiver 470, the packet processing engine 472, the output queue 474, the topographic addressing engine 478 and the coordinate input module 438. The transmitter/receiver and the output queue are similar to the transmitter/receiver 360 and the output queue 364 of the channel card 240 described above with reference to FIG. 3, and will not be described further. The coordinate input module is similar to the coordinate input module 238 of the router 101 described above with reference to FIG. 2, and will not be described further.

The transmitter/receiver 470 has an communication interface connected to the communication link 115 and a channel interface connected to the packet processing engine 472. The packet processing engine 472 has an output connected via the output queue 474 to the message output 480. The packet processing engine 472 also has a message input connected to the message input 482 and an address input connected to receive the destination coordinate set generated by the topographic addressing engine 478. The packet processing engine additionally includes an input connected to the output of the coordinate input module 438.

The topographic addressing engine 478 has inputs connected to the destination address input 484 and to the output of the coordinate input module 438. The coordinate input module has an input connected to the coordinate set input 486. The message input 482, message output 480 and the destination address input 484 are connected to the host device (not shown). The coordinate set input 486 may also be connected to the host device or may receive the topographic coordinate set of the end-user device 112 independently of the host device.

After installation of the end-user device 112 in the network 100, the coordinate input module 438 of the end-user device 112 receives the topographic coordinate set of the end-user device 112. The topographic coordinate set may be received via the coordinate set input 486. Ways of determining and inputting the topographic coordinate set of a topographic network device such as the end-user device 112 will be described in more detail below.

Upon receiving the topographic coordinate set of the end-user device 112, the coordinate input module 438 feeds the topographic coordinate set to the packet processing engine 472. The packet processing engine packages the topographic coordinate set in a packet identified as a topographic coordinate packet, described above, and forwards the packet to the transmitter/receiver 470. The transmitter/receiver transmits the packet to the router 101 (FIG. 1) via the communication link 115. This informs the router 101 of the topographic coordinate set of the end-user device 112.

At the router 101, the topographic coordinate set of the end-user device 112 is stored in the coordinate store 236 as a connected device coordinate set, as described above. The connected device coordinate set of the end-user device 112 is stored in the coordinate store linked to the channel address of the channel of the router directly connected to end-user device 112 by the communication link 115. In response to receiving the topographic coordinate set of the end-user device 112, the router 101 transmits its own topographic coordinate set at least to the end-user device 112. The end-user device 112 may store the topographic coordinate set received from the router 101. Alternatively, the end-user device 112 may discard the topographic coordinate set received from the router 101 since messages originating at the end-user device 112 are automatically transmitted to the router 101regardless of the destination network device to which the message is addressed.

To receive a message, the transmitter/receiver 470 receives a bitstream from the router 101 via the communication link 115 and forwards the bitstream to the packet processing engine 472. The packet processing engine detects the packet boundaries, extracts the message from the packets and feeds the message to the message output 480 via the output queue 474.

To transmit a message, the end-user device 112 receives the message from the host (not shown) via the message input 482 and receives the destination address from the host via the destination address input 484. The destination address passes to the topographic addressing engine 478. The topographic addressing engine translates the real-world name or non-topographic network address of the topographic network device that is the destination of the message, i.e., the destination network device, to a destination coordinate set, i.e., the topographic coordinate set of the destination network device. The topographic addressing engine may employ a look-up table to perform this translation. The look-up table may be a self-updating look-up table that automatically learns the topographic coordinate set and real-world address of each destination network device to which a message is addressed. The topographic addressing engine feeds the destination coordinate set DESTINATION COORDINATE SET for the message to the packet processing engine 472.

The message passes from the message input 482 to the packet processing engine 472. The packet processing engine packages the message in one or more packets and includes the destination coordinate set received from the topographic addressing engine 478 in the header of each packet. The packet processing engine may additionally include the topographic coordinate set of the end-user device 112 in the header of at least the first packet of the message. The packet processing engine feeds the packets to the transmitter/receiver 470. The transmitter/receiver transmits the packets to the router 101 via the communication link 115. The router 101 forwards the message towards the destination network device as described above.

The coordinate input module 438 is optional and may be omitted from the end-user device 112. In this case, the end-user device 112 receives its topographic coordinate set via a communication link temporarily substituted for the communication link 115 connected to the communication interface of the transmitter/receiver 470. The topographic coordinate set is packaged in a packet identified as a topographic coordinate packet. The packet processing engine is configured to store the topographic coordinate packet temporarily, and to re-transmit the topographic coordinate packet when the communication link 115 is re-connected to the communication interface of the transmitter/receiver 470.

To enable a topographic network device, such as the router 101 or the end-user device 112, to transmit its own topographic coordinate set to the topographic network devices directly connected to it, the topographic coordinate set of the topographic network device is provided to the topographic network device. The topographic network device may be provided with its topographic coordinate set in a different ways, exemplary ones of which will be described next.

A person may determine the topographic coordinate set of the topographic network device by reading a suitable map, plan or other drawing. In this disclosure, the word map will be regarded as encompassing maps, plans and other drawings. The person may alternatively determine the topographic coordinate set of the topographic network device by reading the display of a GPS receiver co-located with the topographic network device. The person may then enter the topographic coordinate set into the topographic network device using an input device, such as a keyboard, connected to the topographic network device. The input device may be connected to general-purpose control port provided in the topographic network device, for example. Alternatively, the input device may be connected to a communication input module, such as the coordinate input module 238 shown in FIG. 2. The input device may be connected to the port directly or via a computer to enable the topographic coordinate set to be entered.

When the topographic network device is a computer connected to the network 100 as an end-user device, the person may user the computer's own keyboard to type the topographic coordinate set, determined as exemplified above, into a data entry screen of a network set-up program running on the computer. A router may also run a network set-up program into which the topographic coordinate set of the router can be entered.

The topographic coordinate set of a topographic network device, determined as exemplified above, may be transmitted to the topographic network device via one of its own network connections. For example, the topographic coordinate sets of all the topographic network devices directly connected to a first network device may be input into the first network device, and the first network device may transmit the topographic coordinate sets to the topographic network devices directly connected to it. Each topographic coordinate set may be contained in a packet identified as a topographic coordinate packet containing the topographic coordinate set of the first network device. The topographic network devices are each configured to extract the topographic coordinate set from a received topographic coordinate packet and to store the topographic coordinate set as its own topographic coordinate set. For example, the router 101 shown in FIG. 2 may receive the topographic coordinate packet at one of its channel inputs. Then channel sends the topographic coordinate packet through the router to the coordinate store 236. In the coordinate store, the topographic coordinate set is extracted from the topographic coordinate packet and is stored in a location in the memory 241 allocated for storing the topographic coordinate set of the router 101.

The topographic network device may be configured to receive its topographic coordinate set electronically from a co-located GPS receiver. FIG. 1 shows the GPS receiver 120 connected to the end-user device 112 and the GPS receiver 122 connected to the router 104. For stationary topographic network devices, the connection need only be a temporary connection established when the topographic network device is installed in the network. The temporary connection between the GPS receiver 122 and the router 104 is indicated by the broken line 124. Alternatively, the GPS receiver may be built into the topographic network device. The GPS receiver 126 is shown built into the end-user device 128.

The topographic network device may include a GPS data port configured to connect to a GPS receiver. The topographic network device then receives its topographic coordinate set from the GPS receiver electronically via the GPS data port. The GPS data port may be a port specifically configured to connect to a GPS receiver, or may be a conventional serial, parallel, Ethernet or other network, USB, IEEE 1394 or other suitable port capable of receiving data output by a GPS receiver as a topographic coordinate set. In the router 101 shown in FIG. 2, the coordinate input module 238 may be configured to include a GPS data port (not shown). Alternatively, the GPS receiver may include an output configured to connect to one of the channel inputs of the router 101 and to deliver the topographic coordinate set in a packet labelled as a topographic coordinate packet, as described above.

The above-described embodiment of network 100, in which each topographic network device transmits the message to the directly-connected topographic network device physically closest to the destination network device, may be modified to take account of network traffic. In this case, each topographic network device, as a first network device, does not transmit the message to a second network device closest to the destination network device when the communication link to the second network device is congested. Instead, the first network device transmits the message to a third network device. The third network device is closer to destination network device than the first network device and is directly connected to the first network device by a communication link that is less congested than the communication link to the second network device. However, the third network device is not the directly-connected topographic network device that is closest to the destination network device.

Figure 5A:
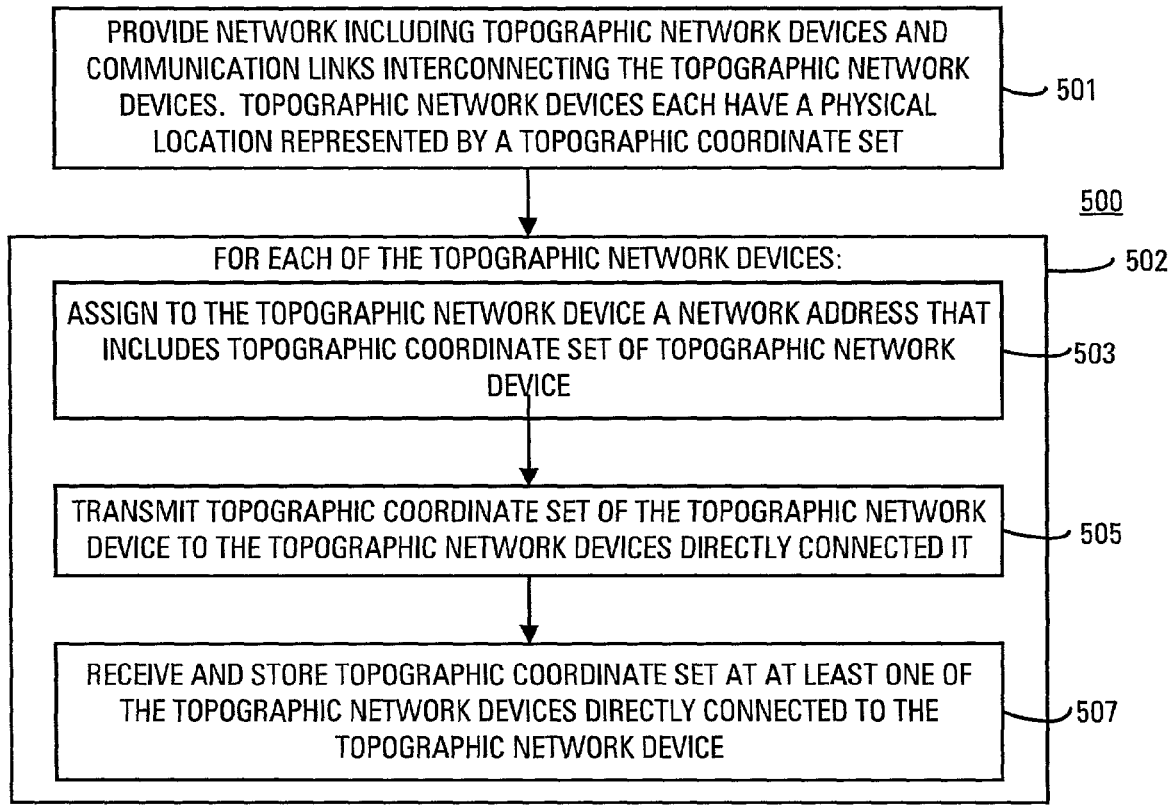
FIG. 5A is a flow chart showing a method for establishing a network according to the invention.

A method 500 for establishing a network according to the invention for communicating information will now be described with reference to FIG. 5A.

In the method, in process 501, a network is provided. The network includes topographic network devices and communication links interconnecting the topographic network devices. Each topographic network device has a physical location represented by a topographic coordinate set.

In process 503, a network address that includes the topographic coordinate set of the topographic network device is assigned to each topographic network device.

In process 505, the topographic coordinate set of at least one topographic network device, an intermediate network device, is transmitted to the topographic network devices directly connected to the intermediate network device.

In process 507, the topographic coordinate set of the intermediate network device is received and stored by the topographic network devices directly connected to the intermediate network device.

Process 503 may include providing a global positioning system receiver, co-locating the global positioning system receiver and the topographic network device, and determining the topographic coordinate set of the topographic network device from the global positioning system receiver. Alternatively, a map may be provided, the topographic coordinate set of the topographic network device may be determined from the map, and the topographic coordinate set may be input into the topographic network device.

Process 505 may include inserting the topographic coordinate set into a packet configured for transmission through the network, and transmitting the packet through the network to the topographic network devices connected to the intermediate network device.

Process 507 may include receiving the packet including the topographic coordinate set at at least one of the topographic network devices directly connected to the intermediate network device as a receiving network device, sending the packet through the receiving network device, extracting the topographic coordinate set from the packet, and storing the topographic coordinate set as a connected device coordinate set.

Figure 5B:
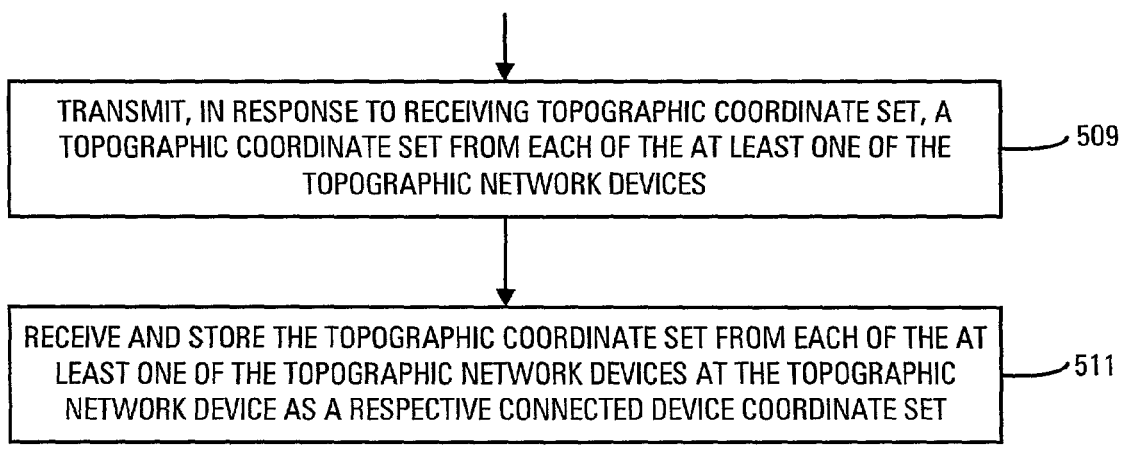
FIG. 5B is a flow chart showing additional processes that may be included in the method shown in FIG. 5A.

The method may additionally include processes 509 and 511 shown in FIG. 5B. In process 509, in response to receiving the topographic coordinate set, respective topographic coordinate sets are transmitted from the topographic network devices directly connected to the intermediate network device.

In process 511, the topographic coordinate sets are received and stored at the intermediate network device as respective connected device coordinate sets.

Figure 5C:
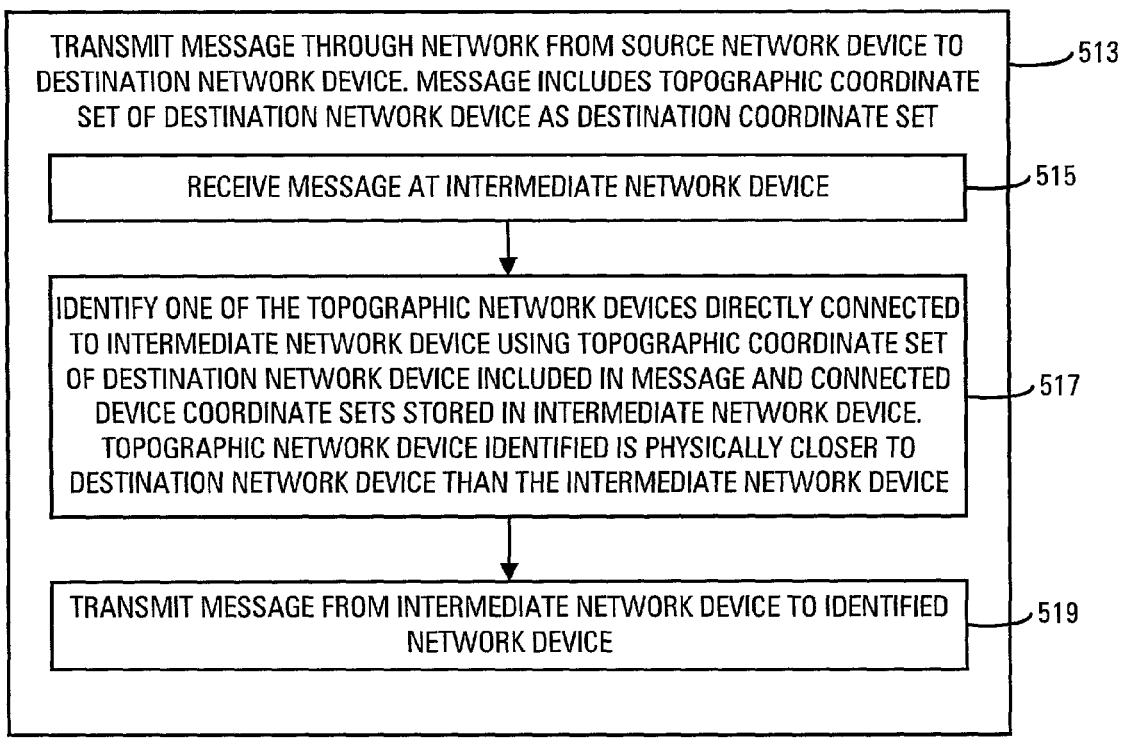
FIG. 5C shows an additional process that may be included in the method shown in FIG. 5A.

The method may additionally include the process 513 shown in FIG. 5C. In process 513, a message is transmitted through the network between a source network device and a destination device. The source network device and the destination network devices are two of the topographic network devices. The message includes the topographic coordinate set of the destination network device. Process 513 includes processes 515, 517 and 519.

In process 515, the message is received at the intermediate network device.

In process 517, one of the topographic network devices directly connected to the intermediate network device is identified using the topographic coordinate set of the destination network device included in the message and the connected device coordinate sets stored in the intermediate network device. The topographic network device identified is physically closer to the destination network device than the intermediate network device.

In process 519, the message is transmitted from the intermediate network device to the identified network device.

The method 500 may additionally comprise transmitting one or both of (a) a device type indication, and (b) additional topographic information, of the intermediate network device to the network devices directly connected to the intermediate network device.

Figure 6:
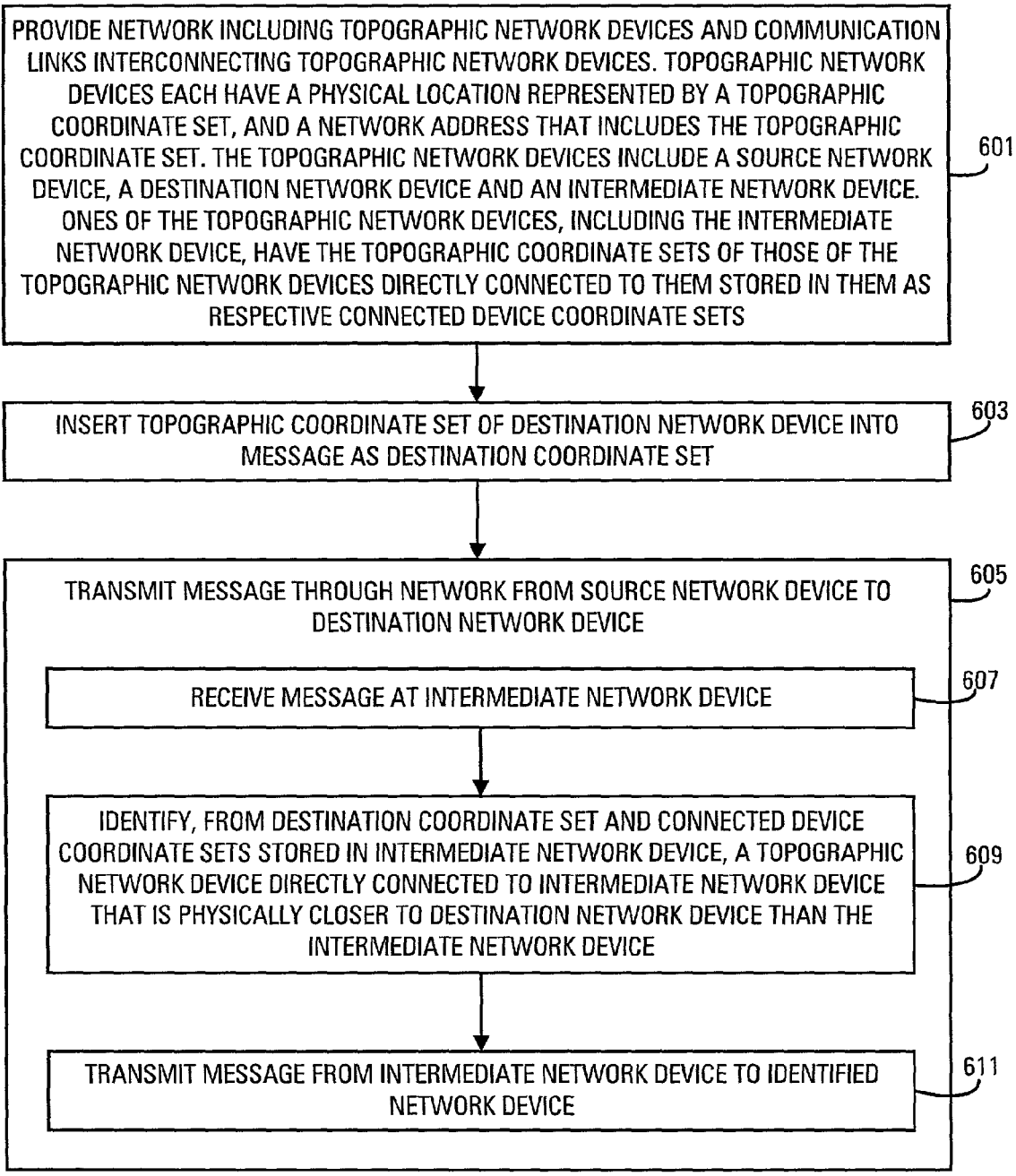
FIG. 6 is a flow chart showing a method for transmitting a message through a network according to the invention.

FIG. 6 is a flow chart illustrating a method 600 for transmitting a message through a network according to the invention.

In process 601, a network is provided. The network includes topographic network devices and communication links interconnecting the topographic network devices. Each topographic network device has a physical location represented by a topographic coordinate set, and additionally has a network address that includes the topographic coordinate set. The topographic network devices include a source network device, a destination network device and an intermediate network device. Ones of the topographic network devices, including the intermediate network device, store the topographic coordinate sets of those of the topographic network devices directly connected to them as respective connected device coordinate sets.

In process 603, the topographic coordinate set of the destination network device is appended to the message.

In process 605, the message is transmitted through the network from the source network device to the destination network device. Process 605 includes processes 607, 609 and 611.

In process 607, the message is received at the intermediate network device.

In process 609, one of the topographic network devices directly connected to the intermediate network device is identified using the topographic coordinate set of the destination network device included in the message and the connected device coordinate sets stored in the intermediate network device. The topographic network device identified is physically closer to the destination network device than the intermediate network device.

In process 611, the message is transmitted from the intermediate network device to the identified network device.

In process 609, the topographic network device identified may be the topographic network device directly connected to the intermediate network device that is physically closest to the destination network device.

Process 609 may include performing a topographic calculation using the topographic coordinate set of the destination network device and the connected device coordinate sets stored in the intermediate network device.

In process 601, the topographic network devices, including the intermediate network device, may additionally store either or both of (a) a device type indication, and (b) additional topographic information for the topographic network devices directly connected to the intermediate network device, and, in process 609, the one of the topographic network devices may be identified additionally in response to at least one of the device type information and the additional topographic information.

The network 100 and methods described above may be modified to increase the efficiency with which a message is transmitted from the source network device to the destination network device. For example, in addition to its topographic coordinate set, each topographic network device of the network 100 may transmit a device-type indication to the topographic network devices directly connected to it. The device-type indication indicates whether or not the topographic network device has a message forwarding capability. A topographic network device has a message forwarding capability when it can receive a message from a first network device and can transmit the message to a second network device different from the first network device. A router has a message forwarding capability whereas an end-user device generally does not. Each router that receives the device-type indication may store the device-type indication in its coordinate store linked to the channel address of the channel through which it received the device-type indication.

In a router that stores device-type indications, the topographic processor, e.g., the topographic processor 368 shown in FIG. 3, additionally uses the device-type indication in the above-described process that identifies the channel of the router to which to send the message for onward transmission. For example, after identifying the channel that is directly connected to the topographic network device that is closer or closest to the destination network device, the topographic processor may check the device-type indication linked to the identified channel. When the topographic processor determines from the device-type indication that the identified channel is directly connected to a topographic network device that lacks a message forwarding capability, and this topographic network device is not the destination network device, the topographic processor repeats the channel identification process to identify another of its channels. This ensures that the router transmits the message to a topographic network device that lacks a message forwarding capability only when such topographic network device is the destination network device.

Additionally or alternatively, in addition to its topographic coordinate set, each topographic network device of the network 100, as a first network device, may transmit additional topographic information to the topographic network devices directly connected to it as second network devices. The additional topographic information is information relating to the second network devices, and may be general or specific. General topographic information indicates a range of topographic coordinates that cannot be reached from the first network device via the second network devices. Specific topographic information includes a copy of the connected device coordinate sets stored in the first network device. The connected device coordinate sets stored in the first network device relate to the second network devices. Each router that receives the additional topographic information may store the additional topographic information in its coordinate state linked to the channel address of the channel through which the additional topographic information was received.

In a router that receives the additional topographic information, the topographic processor, e.g., the topographic processor 368 shown in FIG. 3, uses additional topographic information in the above-described process that identifies the channel of the router to which to send the message for onward transmission. The topographic processor uses the additional topographic information to avoid transmitting the message to a topographic network device that lacks the communication links necessary to forward the message efficiently to the destination network device.

When the additional topographical information includes specific topographical information, the topographic processor 368 uses the specific topographic information to route the message more efficiently. In this case, the topographic processor identifies the channel of the router to which to send the message for onward transmission by looking beyond the connected device coordinate sets of the topographic network devices directly connected to the router 101, i.e., the directly-connected topographic network devices, to the connected device coordinate sets of the topographic network devices directly connected to the directly-connected network devices. Identifying the channel to which to send the message using the connected device coordinate sets of the topographic network devices directly connected to the directly-connected network devices provides the ability to route the message to the destination network device more directly than identifying the channel using only on the connected device coordinate sets of the directly-connected network devices.

An example of the use of the additional topographical information to route messages more directly will now be described with reference to FIG. 1. In the network 100, the physical location of the router 101 is west of that of the router 102. Hence, upon receiving a message addressed to the destination network device 129 directly connected to the router 108 located in Tokyo, Japan, the router 103 would tend to forward such message to the router 101 since the router 101 is west of the router 102. However, no communication link extends from the router 101 to a router located west of the router 101. As a result, if the router 103 transmitted the message to the router 101, the router 101 would have to return the message, marked as undeliverable, to the router 103, or would have to forward the message to the router 102.

The additional topographic information received by the router 103 from the routers 101 and 102 enables the router 103 to route the message addressed to the end-user device 129 more directly, i.e., via the router 102. The additional topographic information received from the router 101 may be general topographic information indicating that no communication links extend from the router 101 to topographic network devices located west of 123° W. Alternatively, the additional topographic information received from the router 101 may be specific topographic information composed of the connected device coordinate sets of the topographic network devices directly connected to the router 101. This specific topographical information indicates that no topographic network devices located west of 123° W are directly connected to the router 101.

The additional topographic information received from the router 102 may be general topographic information indicating no relevant limitations on westward communication links extending from the router 102. Alternatively, the additional topographic information received from the router 102 may be specific topographic information composed of the connected device coordinate sets of the topographic network devices directly connected to the router 102. One of the connected device coordinate sets corresponds to the topographic coordinate set of the router 108.

The topographic processor of the router 103 operates in response to the destination coordinate set of the message, the connected device coordinate sets of the topographic network devices directly connected to router 103, including the routers 101 and 102, and the additional topographic information to identify the channel of the router 103 to which to send the message. The additional topographic information includes the additional topographic information received from the routers 101 and 102. As a result, the channel identified is that connected to the router 102.

As an alternative to additional topographic information being communicated among the topographic network devices of the network 100, the additional topographic information may be built into the topographic network devices of the network or may be provided to each topographic network device using the network in a manner akin to the way in which the topographic coordinate set is provided to the topographic network device.

Additional topographic information provided in the manner just described could be used to provide information relating to substantially static aspects of the network, such as the topographic coverage of the network and the topographic coordinate sets of the topographic network devices that provide connections between the network and other networks. Such additional topographic information can also indicate the locations in the network of dead ends, blind alleys and other impediments to the efficient flow of messages. Such additional topographic information can additionally or alternatively indicate the locations in the network of short cuts and other elements that promote the efficient flow of messages. Such additional topographic information can also provide information relating to static and dynamic aspects of the network, such as permanently or temporarily congested or under-used communication links.

The topographic processor in each of the topographic network devices uses such additional topographic information to perform a routing check a proposed routing decision before the routing decision is implemented. The topographic processor can then make a new routing decision in the event that the routing check discovers a potential problem in the proposed routing decision, or if a better routing decision can be made.

Figure 7:
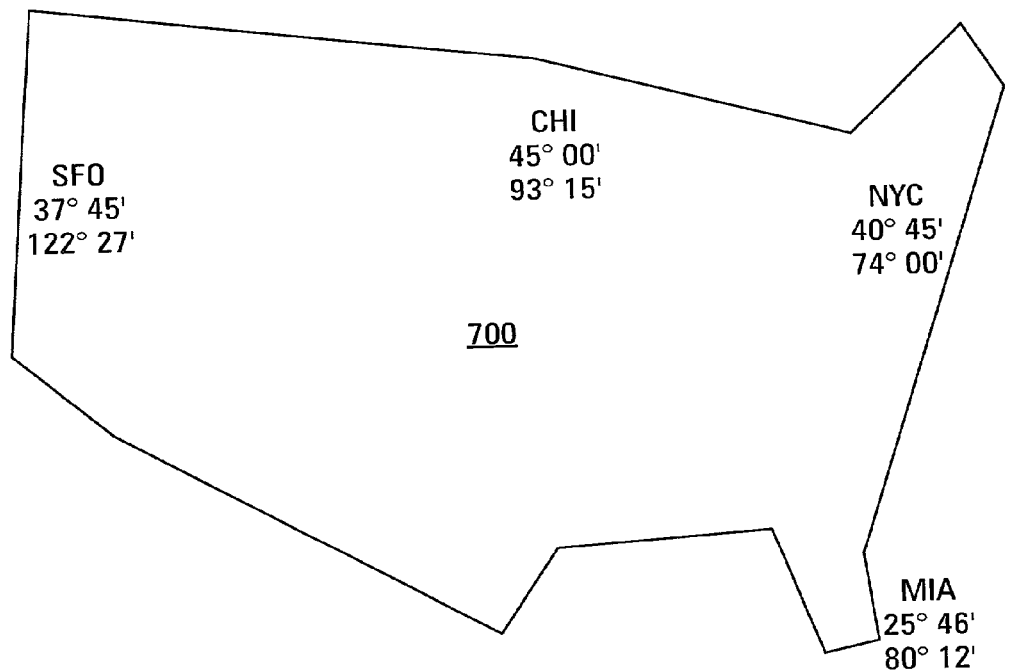
FIG. 7 is a schematic drawing showing an example of a network according to the invention that covers the United States and that is connected to the rest of the world by a small number of topographic network devices.

The network may be constructed to have a hierarchical structure in which higher-speed, more efficient routes are deliberately provided, and are identified by the additional topographic information. For example, the additional topographic information may identify international connections to and from the network. FIG. 7 shows an example of the network 700 that covers the United States and is connected to the rest of the world by a small number of topographic network devices, each of which will be called an international network device. The efficiency of such a network is improved by providing additional topographic information to the topographic network devices constituting the network 700. The additional topographic information indicates the topographic extent of the network 700, a list of the topographic coordinate sets of the international network devices of the network and the topographic extent of the network service provided via each of the international network devices. The additional topographic information enables the network 700 to route a message addressed to a destination network device located outside the network to the international network device having onward connections to the destination network device. The additional topographic information prevents the message from having find a suitable international network device by trial and error.

In the example shown, the network 700 includes international network devices for north-bound, south-bound, west-bound and east-bound messages in Chicago, Miami, San Francisco and New York, respectively. In the additional topographic information, the topographic extent of network is indicated by a number of topographic coordinate sets, each of which defines a vertex of a polygon drawn around the network. The topographic extent of the network could alternatively be indicated by a look-up table, for example.

Figure 8:
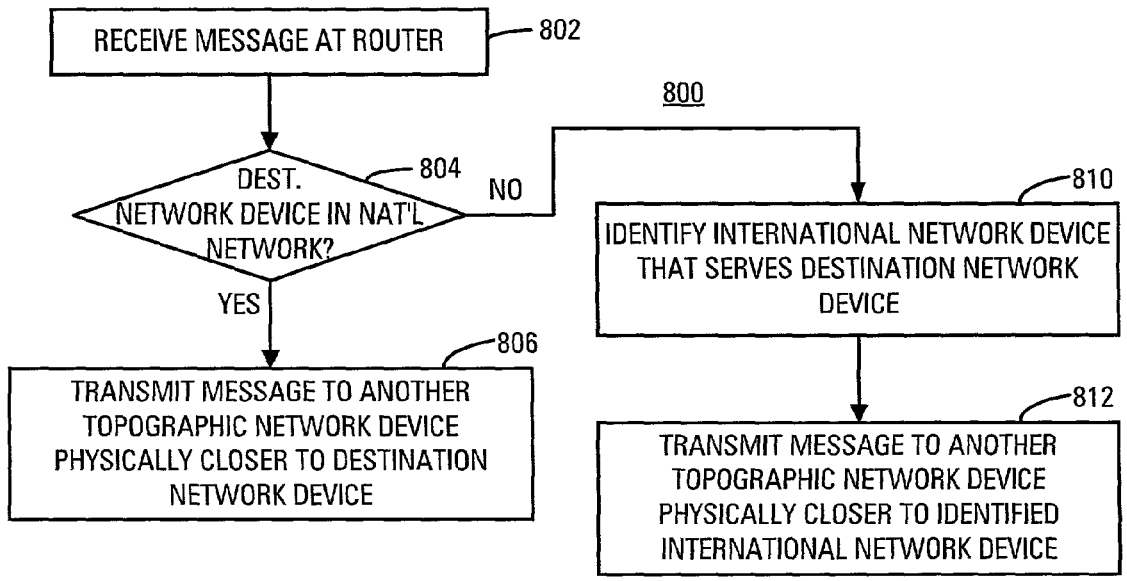
FIG. 8 is a flow chart illustrating a method according to the invention performed by the routers of the network shown in FIG. 7 to determine the routing of a message.

In the network 700, each router through which a message passes performs the method 800 shown in FIG. 8 to determine the routing of the message.

In the method 800, in process 802, the message is received at the router.

In process 804, a test is performed on the destination coordinate set of the message to determine whether the destination network device lies within the network 700. The topographic extent of the national network is indicated by the additional topographic information stored in the router.

When the test result in process 804 is YES, execution advances to process 806, where the router transmits the message to another topographic network device that is physically closer to the destination network device. For example, topographic processor of the router uses the destination coordinate set of the message to identify the channel of the router directly connected to another topographic network device that is physically closer to the destination network device, and the message is sent to the identified channel for onward transmission.

When the test result in process 804 is NO, execution branches to process 810. In process 810, the international network device that serves the range of topographic coordinate sets that includes the destination coordinate set is identified.

In process 812, the router transmits the message to another topographic network device that is physically closer to the international router identified in process 810. For example, the topographic processor of the router uses the topographic coordinate set of the international network device identified in process 810 to identify the channel of the router directly connected to another topographic network device that is physically closer to the identified international network device. The message is then sent to the identified channel for onward transmission towards the destination network device via the international network device. In this, the topographic processor identifies the channel of the router using the topographic coordinate set of the international network device instead of the destination coordinate set.

The national network shown in FIG. 7 can additionally be given a hierarchical internal structure in which the network is divided into regions interconnected by high-capacity communication links. A high-capacity communication link is a communication link capable of transporting more bits in a given time than a conventional communication link. The higher capacity may be obtained, for example, by a greater transmission bandwidth, or a greater parallel message carrying capability, or otherwise. In this case, the additional topographic information provided directly to the topographic network devices enables the topographic network devices to route the messages in a manner that takes advantage of the hierarchical internal structure of the network. In particular, the topographic network devices can use the additional topographic information in appropriate circumstances to override, at least in part, the point-to-point topographic routing scheme described above and instead to route the message via a higher-speed route.

Figure 9:
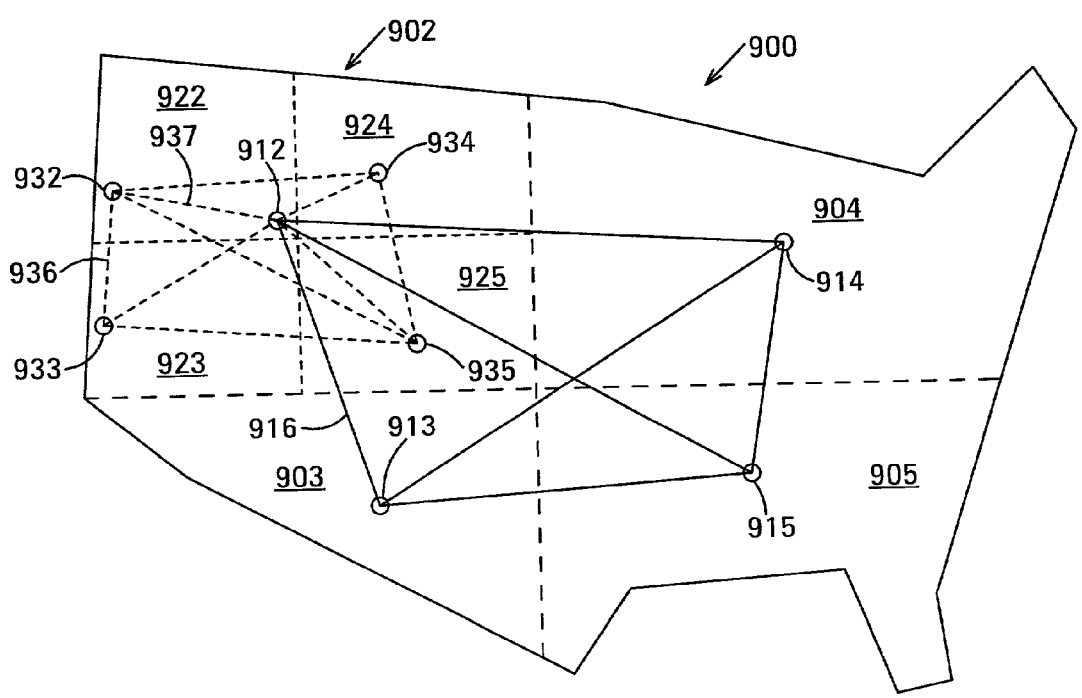
FIG. 9 is a schematic drawing showing an example of a network according to the invention that is divided into regions and in which at least the routers of the network are provided with additional topographic information relating to the regions.

FIG. 9 shows an example of a network 900 in which the network is divided into regions and at least the routers of the network are provided with additional topographic information relating to the regions. The network 900 is shown divided into the regions 902, 903, 904 and 905. Each region includes a router that serves as a regional network device and that will be referred to as such. The regions 902, 903, 904 and 905 include the regional network devices 912, 913, 914 and 915, respectively. The number of regions shown is exemplary, and the network may be divided into more or fewer than the four regions shown. The regions are defined as polygons and are, to the extent possible, square or rectangular to enable their topographic extent to be defined with a minimum number of topographic coordinate sets. Most of the topographic network devices of the network 900 are omitted from FIG. 9 to simplify the drawings.

The regional network devices are interconnected by high-capacity communication links. For example, the regional network devices 912 and 913 are interconnected by the high-capacity communication link 916. Some of the topographic network devices of the network are directly connected to the regional network devices, whereas others of the topographic network devices are indirectly connected to the regional network devices via other topographic network devices. Additional communication links (not shown) exist between each regional network device and others of the topographic network devices, typically routers, located in the region of the network 900 served by the regional network device.

Dividing the network into regions having respective regional network devices interconnected by high-capacity communication links increases the efficiency with which inter-regional messages are routed through the network. Inter-regional messages are routed over most of their travel via the regional network devices and the high-capacity communication links instead of via a point-to-point route. This can reduce the number of routers through which such messages pass and, hence, the potential for delay.

In the network 900, the additional topographic information provided to all routers of the network indicates the topographic extent of the region in which the router is located and additionally indicates the topographic coordinate set of the regional network device of the region. For example, the additional topographic information provided to all routers of the region 902 indicates the topographic extent of the region 902 and additionally indicates the topographic coordinate set of the regional network device 912.

The additional topographic information provided to each regional network device indicates the topographic extent of each of the regions and the identity of each of its channels directly connected to another of the regional network devices. For example, the additional topographic information provided to the regional network device 912 additionally indicates the topographic extent of each of the regions 902–905 and the identity of each of its channels directly connected to another of the regional network devices 913–915.

Figure 10A:
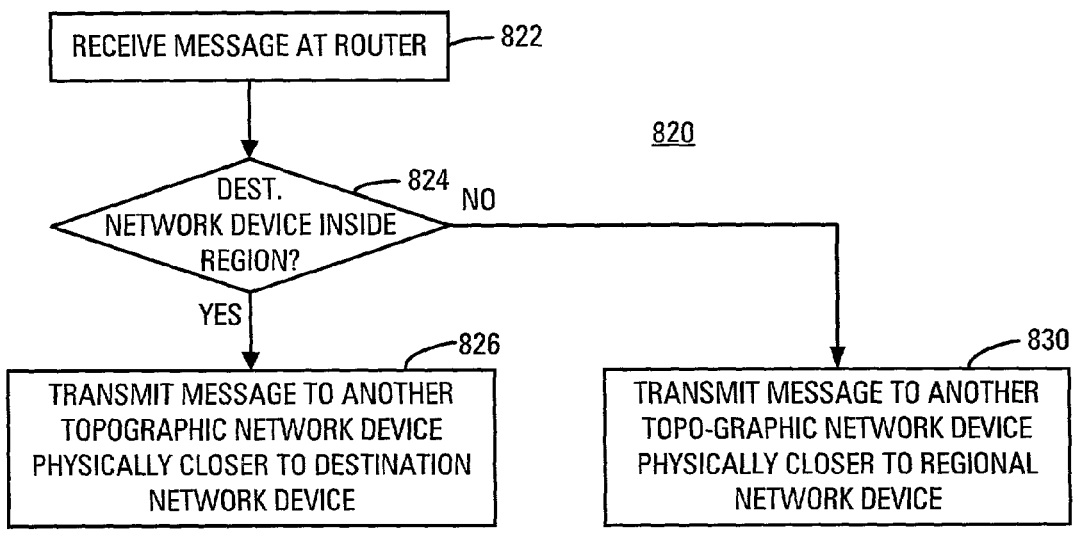
FIG. 10A is a flow chart showing a method performed by the routers of the network shown in FIG. 9 to determine the routing of a message.

Each router through which a message passes, except for a router that serves as a regional network device, performs the method 820 shown in FIG. 10A to determine the routing of the message.

In the method 820, in process 822, the message is received at the router.

In process 824, a test is performed on the destination coordinate set included in the message to determine whether the destination network device lies inside the region in which the router is located. The topographic extent of the region is identified by the additional topographic information stored in the router.

When the test result is YES, execution advances to process 826, where router transmits the message to another topographic network device that is physically closer to the destination network device. For example, the topographic processor of the router uses the destination coordinate set included in the message to identify the channel of the router directly connected another topographic network device that is physically closer to the destination network device. The message is then sent to the identified channel of the router for onward transmission towards the destination network device.

The operation performed in process 826 corresponds to the normal topographic routing process described above, and the message proceeds to the destination network device located in the same region as the router via the point-to-point routing scheme described above.

When the test result in process 824 is NO, execution branches to process 830. In process 830, the router transmits the message to another topographic network device that is physically closer to the regional network device of the region in which the router is located. This other topographic network device may be the regional network device itself. For example, the topographic processor uses the topographic coordinate set of the regional network device to identify the channel of the router directly connected to another topographic network device that is physically closer to the regional network device. The message is then sent to the identified channel of the router for onward transmission towards the regional network device. The topographic coordinate set of the regional network device is part of the additional topographic information stored in the router. The topographic processor performs its normal channel identification routine using the topographic coordinate set of the regional network device instead of the destination coordinate set included in the message.

Figure 10B:
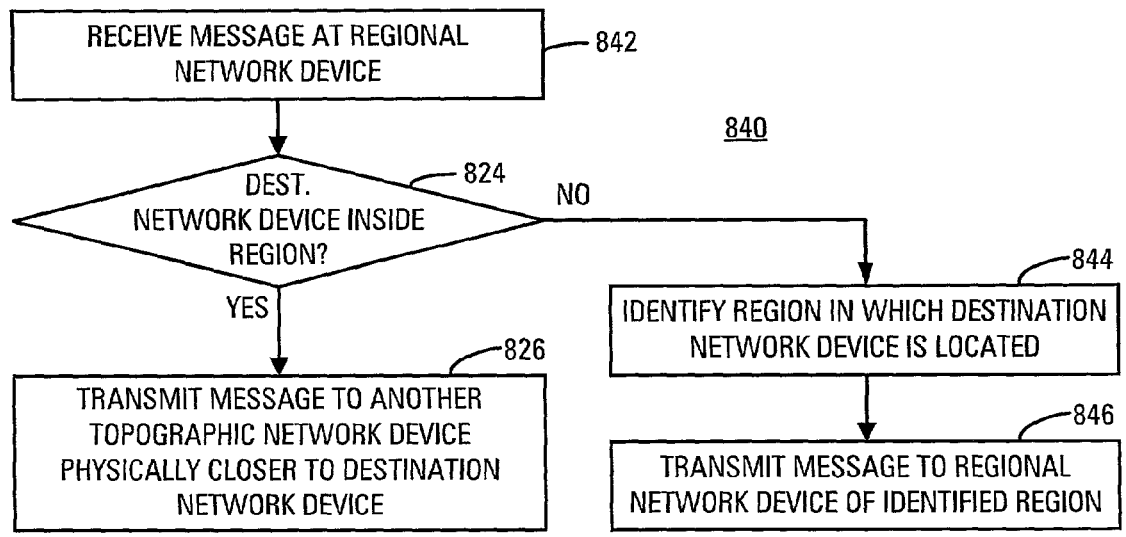
FIG. 10B is a flow chart showing a method performed by the regional network devices of the network shown in FIG. 9 to determine the routing of a message.

The regional network device performs the method 840 shown in FIG. 10B. Elements of the method 840 that correspond to elements of the method 820 shown in FIG. 10A are indicated using the same reference numerals and will not be described again.

In the method 840, in process 842, the message is received at the regional network device.

When the test result in process 824 is YES, execution advances to process 826, described above, and the message proceeds to the destination network device located in the region served by the regional network device via the point-to-point topographic routing scheme described above.

When the test result in process 824 is NO, execution branches to process 844, where the additional topographic information stored in the regional network device and indicating the topographic extent of each of the regions is used to identify the region in which the destination network device is located.

In process 846, the router transmits the message to the regional network device identified in process 844. For example, the topographic processor of the regional network device uses the additional topographic information stored in the regional network device and indicating the channels of the regional network device respectively connected to the other regional network devices to identify the channel of the regional network device directly connected to the regional network device of the region identified in process 844. The message is then sent to the identified channel for transmission to the regional network device of the region identified in process 844.

The regional network device 912, for example, processes outgoing messages received directly or indirectly from source network devices located in the region 902 and including destination coordinate sets indicating destination network devices located in the other regions 903–905. For example, one of the destination network devices may be located in the region 903 served by the regional network device 913. The regional network device 912 additionally processes incoming messages received from source network devices located in the other regions via the regions' respective regional network devices. These messages include destination coordinate sets indicating destination network devices located in the region 902. For example, one of the source network devices may be located in the region 903 served by the regional network device 913.

An example in which the regional network device 912 receives a message from a router located in the region 902, i.e., the region served by the regional network device 912, will now be described. The regional network device 912 performs the method 840 shown in FIG. 10B. The destination coordinate set included in the message indicates that the destination network device is located in the region 903. Accordingly, the test performed at process 824 returns a NO result, and execution branches to process 844. Process 844 identifies the region 903 as the region in which the destination network device is located, process 846 transmits the message to the regional network device 913 of the region 903 identified in process 844.

Upon receiving the message, the regional network device 913 also performs the method 840 shown in FIG. 10B. In this case, the destination coordinate set in the message indicates that the destination network device is located in the region 903 served by the regional network device 913. Accordingly, the test performed at process 824 returns a YES result, and execution advances to process 826. The regional network device 913 transmits the message to the destination network device located in the region 903 using the point-to-point topographic routing scheme described above.

Each region of the network 900 may additionally be sub-divided into sub-regions. The sub-regions may be further sub-divided to provide two or more levels of sub-regions. FIG. 9 shows an example in which the region 902 is sub-divided into a single level of sub-regions, i.e., the sub-regions 922, 923, 924 and 925. The regions 903–905 are also sub-divided into sub-regions, but these sub-regions are not shown to simplify the drawing. The number of sub-regions shown is exemplary, and the region 902 may be divided into more or fewer than four sub-regions. Moreover, each region 902–905 may be divided into a different number of sub-regions, and the number of levels of sub-regions may differ among the regions and sub-regions. The sub-regions are defined as polygons.

The sub-regions 922, 923, 924 and 925 are served by the sub-regional network devices 932, 933, 934 and 935, respectively. The sub-regional network devices 932–935 are interconnected with one another and with the regional network device 912 by high-capacity communication links. For example, the sub-regional network devices 932 and 933 are interconnected by the high-capacity communication link 936, and the sub-regional network device 932 and the regional network device 912 are interconnected by the high-capacity communication link 937. The capacity of the communication links interconnecting the sub-regional network devices with one another and the regional network device may be less than that of the communication links, such as the communication link 916, interconnecting the regional network devices 912–915. Additional communication links (not shown) exist between each sub-regional network device and others of the network devices (not shown), typically routers, located in the sub-region served by the sub-regional network device.

Further dividing each region of the network into sub-regions having sub-regional network devices interconnected to one another and to the regional network devices by high-capacity communication links increases the efficiency with which intra-regional messages are routed through the network. Intra-regional messages are routed via the sub-regional network devices and high-capacity communication links instead of via a point-to-point route across the region. This reduces the number of routers through which such messages pass and, hence, the potential for delay. The efficiency with which inter-regional messages are routed is further increased.

In a network, such as the network 900, in which the regions are subdivided, the additional topographic information provided to all routers of the network indicates the topographic extent of the sub-region in which the router is located and additionally indicates the topographic coordinate set of the sub-regional network device of the sub-region.

The additional topographic information provided to each sub-regional network device indicates the topographic extent of each the sub-regions of the region and the identity of each of its channels directly connected to another sub-regional network device in the region and to the regional network device of the region. For example, the additional topographic information provided to the sub-regional network device 932 indicates the topographic extent of each of the sub-regions 922–925 of the region 902 and the identity of each of its channels directly connected to one of the sub-regional network devices 933–935 and to the regional network device 912.

The additional topographic information provided to each router indicates the topographic extent of each of the regions, the identity of each of its channels directly connected to another regional network device, the topographic extent of each the sub-regions of the region served by the regional network device and the identity of each of its channels directly connected to one of the sub-regional network devices of the region. For example, the additional topographic information provided to the regional network device 912 indicates the topographic extent of each of the regions 902–905, the identity of each of its channels directly connected to the regional network devices 913–915, the topographic extent of each of the sub-regions 922–925 of the region 902 and the identity of each of its channels directly connected to the sub-regional network devices 932–935.

Figure 10C:
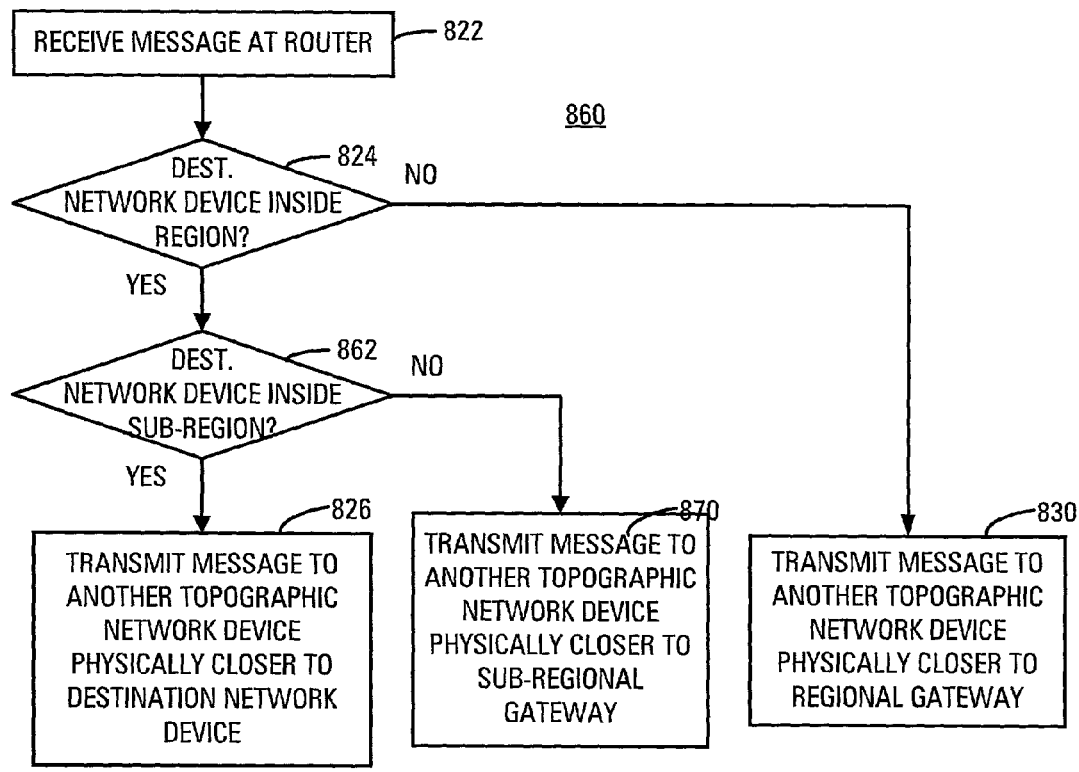
FIG. 10C is a flow chart showing a method performed by the routers of the network shown in FIG. 9 to determine the routing of a message when the regions are divided into sub-regions.

Each router through which a message passes, except for a router that serves as a regional network device or a sub-regional network device, performs the method 860 shown in FIG. 10C to determine the routing of the message. Elements of the method 860 that correspond to elements of the method 820 shown in FIG. 10A are indicated using the same reference numerals and will not be described again.

A YES result in process 824, described above, causes execution to advance to process 862.

In process 862, a test is performed on the destination coordinate set included in the message to determine whether the destination network device lies inside the sub-region. The topographic extent of the sub-region is identified by the additional topographic information stored in the router.

When the test result in process 862 is YES, execution advances to process 826, described above, and the message proceeds to the destination network device located in the same sub-region as the router via the point-to-point topographic routing scheme described above.

When the test result in process 862 is NO, execution branches to process 870. In process 870, the router transmits the message to another topographic network device that is physically closer to the sub-regional network device. For example, the topographic processor of the router uses the topographic coordinate set of the sub-regional network device to identify the channel of the router directly connected to another topographic network device that is physically closer to the sub-regional network device. The topographic coordinate set of the sub-regional network device is part of the additional topographic information stored in the router. The message is then sent to the identified channel for onward transmission towards the sub-regional network device. The message proceeds to the sub-regional network device of the sub-region in which the router is located by the point-to-point topographic routing scheme described above.

In embodiments of the network 900 in which the regions are divided into sub-regions, each sub-regional network device performs the method 840 shown in FIG. 10B, except that, in the above description of the method and in FIG. 10B, instances of the words region and regional are replaced by sub-region and sub-regional, respectively. An outgoing message whose destination coordinate set indicates a destination network device located in another sub-region of the region gives a test result of NO at process 824 in the sub-regional network device. Consequently, processes 844 and 846 transmit such a message directly to the sub-regional network device of the sub-region in which the destination network device is located. An incoming message whose destination coordinate set indicates a destination network device located in the sub-region served by the sub-regional network device gives a test result of YES at process 824 in the sub-regional network device. Consequently, process 826 transmits such a message towards the destination network device located in the sub-region by the point-to-point topographic routing scheme described above.

Figure 10D:
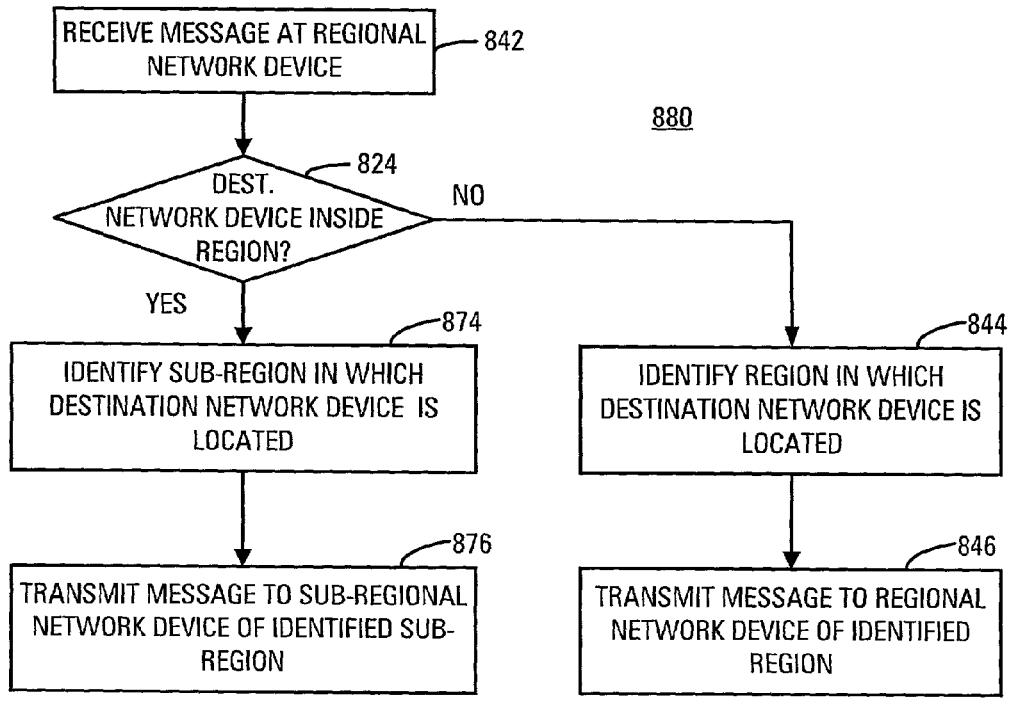
FIG. 10D is a flow chart showing a method performed by the regional network devices of the network shown in FIG. 9 to determine the routing of a message when the regions are divided into sub-regions.

In embodiments of the network 900 in which the regions are divided into sub-regions, each regional network device performs the method 880 shown in FIG. 10D. Elements of the method 880 that correspond to elements of the methods 820 and 840 shown in FIGS. 10A and 10B, respectively, are indicated using the same reference numerals and will not be described again.

A YES result in process 824, described above, causes execution to advance to process 874.

In process 874, the additional topographic information stored in the regional network device and indicating the topographic extent of each of the sub-regions into which the region is divided is used to identify the sub-region in which the destination network device is located.

In process 876, the regional network device transmits the message directly to the sub-regional network device of the sub-region identified in process 874. For example, the topographic processor of the regional network device uses the additional topographic information stored in the regional network device and indicating each channel of the regional network device connected to one of the sub-regional network devices of the region to identify the channel of the regional network device directly connected to the sub-regional network device of the sub-region identified in process 874. The message is then sent to the identified channel for direct transmission to the sub-regional network device of the sub-region identified in process 874.

A NO result in process 824, described above, causes execution to branch to processes 844 and 846 described above, which cause the message to be transmitted directly to the regional network device of the region identified in process 844.

An example in which the regional network device 912 receives a message from a router located in the sub-region 923 of the region 902 served by the regional network device 912 will now be described. The destination coordinate set included in the message indicates that the destination network device is located in the region 903. Accordingly, the test performed at process 824 returns a NO result, and execution branches to process 844. Process 844 identifies the region 903 as the region in which the destination network device is located and process 846 transmits the message directly to the regional network device 913 of the region 903.

Another example, in which the regional network device 912 receives a message from the regional network device 913 of the region 903, will now be described. The destination coordinate set included in the message indicates that the destination network device is located in the region 902. When the regional network device performs the method 880 shown in FIG. 10D, the test performed at process 824 returns a YES result, and execution advances to process 874. Process 874 identifies the sub-region 923 as the sub-region in which the destination network device is located and process 876 transmits the message directly to the sub-regional network device 933.

The sub-regional network device 933 performs the method 840 shown in FIG. 10B, modified as described above for operation in the sub-regional network device. In the method 840, the destination coordinate set of the message indicates that the destination network device is inside the sub-region 923 served by the sub-regional network device 933. Consequently, process 826 is performed to transmit the message towards the destination network device by the point-to-point topographic routing scheme described above. In the point-to-point topographic routing scheme, the message is transmitted to the destination network device either directly or via one or more intermediate network devices, as described above.

Modifications to the above-described methods to enable them to operate with additional levels of the sub-regions will be apparent to a person of ordinary skill in the art. Moreover, modifications to the above methods to integrate a network divided into regions with the international routing scheme described above with reference to FIGS. 7 and 8 will also be apparent to the person of ordinary skill in the art.

The invention is described above with reference to an example in which the network 100 is composed exclusively of topographic network devices, and in which the end-user devices generate the messages addressed with a destination coordinate set composed of the topographic coordinate set of the destination network device. In this example, all the network devices in the network, including end-user devices, are each provided with a topographic coordinate set. However, this is not critical to the invention. Many of the benefits of the invention can be obtained in network in which some, if not all, of the end-user devices are conventional end-user devices and in which most, but not necessarily all, of the routers are topographic network devices. This approach greatly simplifies the task of providing the advantages of topographic routing in existing applications, such as the Internet, in which a very large number of conventional end-user devices exist.

Network devices and network addresses will be regarded in this disclosure as being conventional when they are non-topographic, i.e., when the network address of the network device is unrelated to the physical location of the network device in a coordinate system. Conventional network devices are not provided with respective topographic coordinate sets, identify themselves with conventional network addresses and generate messages addressed with conventional network addresses as their destination network addresses.

Figure 11:
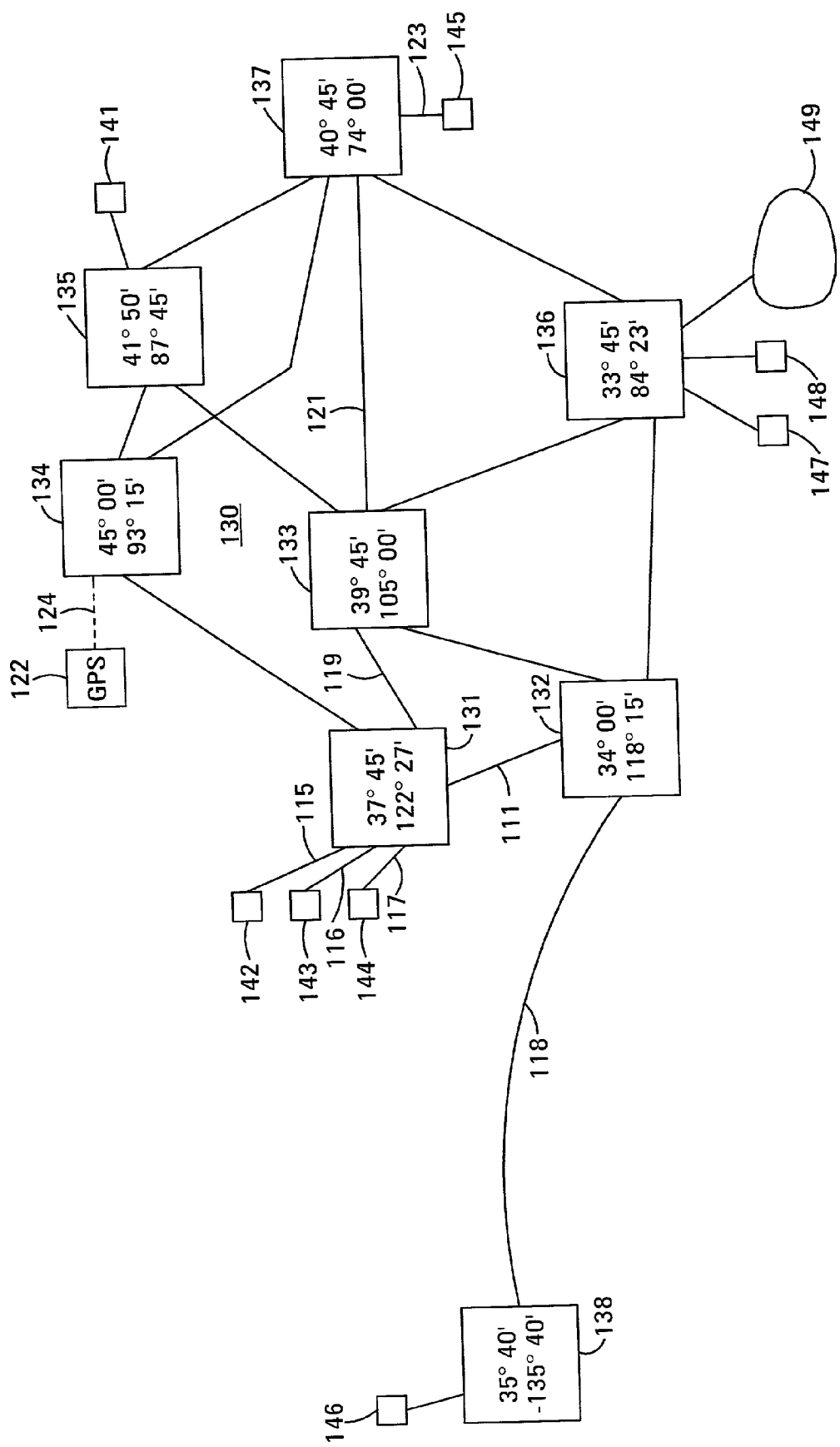
FIG. 11 is a schematic diagram of a highly simplified example of a second embodiment of a network according to the invention.

FIG. 11 is a schematic diagram of a highly simplified example of a second embodiment 130 of a network according to the invention. In the network 130, at least some of the end-user devices are conventional end-user devices. In an embodiment, all of the end-user devices are conventional network devices. The routers 131–138 are topographic network devices, but this is not critical to the invention. Some of the routers may be conventional network devices. Elements of the network 130 that correspond to elements of the network 100 shown in FIG. 1 are indicated using the same reference numerals and will not be described again here.

In the highly-simplified example of the network 130 shown, the routers 131–138 differ from the routers of the network 100 shown in FIG. 1 in that they perform additional processing that enables conventional end-user devices to be connected to them, and that enables them to transmit messages to and to receive messages from conventional end-user devices and other networks composed of conventional network devices. The routers may additionally differ structurally from the routers of the network shown in FIG. 1. However, some of the routers may be similar to the routers of the network shown in FIG. 1, since not all of the routers of the network 130 need be capable of having conventional end-user devices or networks connected to them.

Also forming part of the network 130 are the exemplary end-user devices 141–148 directly connected to ones of the routers 131–138 by respective communication links, e.g., the communication links 115–117. Of the end-user devices in the example shown, at least the end-user devices 142 and 145 are conventional network devices that generate messages with conventional network addresses. Most of the end-user devices that would normally be connected to the routers 131–138 have been omitted to simplify the drawing further. Conventional networks of conventional network devices may also be connected to the network 130. The network devices of such networks will be regarded as being directly connected to the routers of the network 130 to which the networks are respectively connected. For example, network devices in the network 149 will be regarded as being directly connected to the router 136.

The topographic routers of the network 130, including the routers 131–138, each have a network address that includes the topographic coordinate of the router, as described above. However, end-user routers (not shown), which are routers located at the premises of the end-users, need not have topographic coordinate sets as their network addresses. In the description below, an end-user device connected to a router of the network 130, i.e., a topographic router, via a user-level router will be regarded as being directly connected to the topographic router.

Most, if not all, of the end-user devices 141–148 each have a conventional network address, such as a static or dynamic Internet Protocol (IP) address or Universal Resource Locator (URL), as their network address. Other forms of conventional network address unrelated to the position of the network may be used. Those of the end-user devices that are topographic network devices each additionally or alternatively have their topographic coordinate set as their network address.

Similar to the routers of the network 100 described above with reference to FIG. 1, each of the routers 131–138 of the network 130 is configured to receive its own topographic coordinate set, and to transmit its topographic coordinate set to each of the routers directly connected to it. Each of the routers is also configured to receive and store the topographic coordinate set of at least one of the routers directly connected to it. Each topographic coordinate set received is stored as a connected device coordinate set linked to the channel address of the channel through which the router received it. Additionally, each of the routers may optionally store its own topographic coordinate set.

Each of the routers 131–138 is additionally provided with additional network information. The additional network information provided to a router includes connected device information that indicates the conventional network addresses of the end-user devices connected to the router. The additional network information additionally includes translation information that indicates a topographic coordinate set corresponding to at least part of the conventional network address of each end-user device in the network 130.

The translation information enables the router to provide a destination coordinate set for each received message that has been transmitted by a conventional network device and therefore has only a conventional network address. When the router receives a message that lacks a destination coordinate set, it uses the translation information to determine the topographic coordinate set of the router associated with the destination network device indicated by the conventional network address of the message, and inserts the topographic coordinate into the message as the destination coordinate set. The destination coordinate set enables the message to be topographically routed through the network 130 to the destination network device. Two types of translation information are currently envisaged.

The first type of translation information enables the router to perform what will be called direct topographic addressing when the router receives a message that lacks a destination coordinate set. When the router performs direct topographic addressing, the router associated with the destination network device is the router directly connected to the destination network device, and the router inserts the topographic coordinate set of this router into the message as the destination coordinate set. The message is then topographically routed through the network directly to the router directly connected to the destination network device. This router then uses the conventional network address included in the message to forward the message to the destination network device, which is directly connected to it. Direct topographic addressing topographically therefore routes the message directly to the router directly connected to the destination network device.

For example, when a router performs direct topographic addressing on a message conventionally addressed to the end-user device 145 as the destination network device, the router associated with the destination network device is the router 137 since the end-user device 145 is directly connected to this router. The router therefore inserts the topographic coordinate set of the router 137 into the message. The message is topographically routed through the network to the router 137. The router then uses the conventional network address included in the message to forward the message to the end-user device 145 directly connected to it.

Direct topographic addressing enables the network 130 to provide all of the routing efficiency advantages of topographical routing without requiring that all, or any, of the end-user devices be topographic network devices. However, the translation information stored in a router that performs direct topographic addressing may be composed of the conventional network address of every end-user device in the network 130. Each conventional network address is linked to the topographic coordinate set of the router to which the end-user device identified by the conventional network address is directly connected. Accordingly, a router that performs direct topographic addressing has to store a very large quantity of translation information.

The second type of translation information enables the router to perform what will be called indirect topographic addressing when the router receives a message that lacks a destination coordinate set. When the router performs direct topographic addressing, the router associated with the destination network device is the router associated with the domain name that forms part of the destination network address of the message. This router will be called a domain router. The translation information stored in a router that performs indirect topographic addressing may be composed of every domain name in the conventional network addresses of the end-user devices in the network 130. Each domain name is linked to the topographic coordinate set of the corresponding domain router. A common domain router may be shared among several domain names. A router that performs indirect topographic addressing has to store substantially less translation information than one that performs direct topographic addressing.

The router that performs indirect topographic addressing inserts the topographic coordinate set of the domain router into each conventionally-addressed message it receives as the destination coordinate set. The message is then topographically routed through the network 130 directly to the domain router.

The domain router is supplied with translation information composed of the conventional network address of every end-user device having the domain name with which the domain router is associated. Each conventional network address is linked to the topographic coordinate set of the router to which the end-user device identified by the end-user device is directly connected. Thus, the domain router has to store substantially less translation information than one that performs direct topographic addressing.

With respect to the domain router, the router associated with the destination network device indicated by the conventional network address in the message is the router directly connected to the destination network device. The domain router replaces the existing destination coordinate set in the message with the topographic coordinate set of the router directly connected to the destination network device, so that the topographic coordinate set of the router directly connected to the destination network device becomes the destination coordinate set of the message. The message is then topographically routed through the network directly to the router directly connected to the destination network device. This router then uses the conventional network address included in the message to forward the message to the destination network device, which is directly connected to it. Indirect topographic addressing therefore topographically routes the message to the router directly connected to the destination network device by a two-step route that includes the domain router.

For example, when a router performs indirect topographic addressing on a message conventionally addressed to the end-user device 145 as the destination network device, and the router 135 is the domain router associated with the domain name that forms part of the destination network address of the end-user device 145, the router inserts the topographic coordinate set of the domain router 135 into the message as the destination coordinate set. The message is topographically routed through the network to the domain router 135. The domain router replaces the existing destination coordinate set with the topographic coordinate set of the router 137 directly connected to the end-user device 145. The message is topographically routed through the network to the domain router 137. The router 137 then uses the conventional network address included in the message to forward the message to the end-user device 145 directly connected to it.

Indirect topographic addressing provides the advantages of topographic routing while requiring that a router that performs indirect topographic addressing store substantially less translation information than a router that performs direct topographic addressing. Indirect topographic addressing may provide a lower routing efficiency than direct topographic addressing. Indirect topographic addressing may be less efficient, for example, when the domain router is further from the source network device than the destination network device and/or when the domain router and the destination network device lie in opposite directions relative to the source network device.

Indirect addressing has the further advantage that it enables a network to be progressively converted to use topographic addressing. Initially, only those of routers that will serve as domain routers need be topographic routers capable of converting conventional network addresses to destination coordinate sets. Topographic routers without this capability can be used elsewhere in the network. Messages originating at conventional source network devices are conventionally routed from the source network devices to the domain router associated with the destination network device. The messages are then routed from the domain router to the destination network device. Later, as more topographic routers capable of address conversion are installed in the network, the address conversion can be performed closer to the source network device and a larger fraction of the routing can be performed topographically.

A router may receive a hybrid set of translation information that enables it to perform direct topographic addressing in response to some destination network addresses and indirect topographic addressing in response to all other destination network addresses. The router supplied with such translation information can determine more simply whether to perform direct or indirect topographic addressing when it makes this determination based on the domain name that forms part of the destination network address, e.g., the router performs direct topographic addressing in response to all the destination network addresses having one or more given domain names, and performs indirect topographic addressing in response to destination network addresses having all other domain names.

The network 130 operates to transmit a message from a source network device to a destination network device in a manner based on the operation of the network 100 described above with reference to FIG. 1. However, the routers 131–138 are each capable of operating in as many as four different modes. The mode in which a router operates with respect to a given message depends on the location of the router in the network with respect to the route of the message. The router that is directly connected to the source network device at which the message originates operates as the input router for the message. The router that is directly connected to the destination network device to which the message is addressed operates as the output router for the message. The one or more routers though which the message passes between the input router and the output router each operate as an intermediate router for the message. The router associated with the domain name of the conventional network address of the destination network device operates as the domain router for the message. If the message passes through the domain router, the domain router changes the destination coordinate set of the message, as described above, The routers that operate as the input router and output router for an outbound message operate as the output router and input router, respectively, for a reply message sent in response to the original message. A router that operates as, for example, an input router or an output router for one message may operate as an intermediate or a domain router for another message with a different routing.

The method 620 for transmitting a message using the network 130 shown in FIG. 11 will now be described with reference to FIG. 12. In the following description, it will be assumed that the message is contained in a single packet. The packet that contains the message will be referred to below as the message packet. The description will be illustrated by an example in which a message is transmitted from the end-user device 142 as the source network device to the end-user device 145 as the destination network device. Both the end-user devices are conventional network devices. In this example, the router 131 directly connected to the source network device 142 operates as the input router, the router 137 directly connected to the destination network device 145 operates as an output router and, when indirect topographic addressing is employed, the router 135 is the domain router of the domain that forms part of the destination network address.

In process 621, a network that includes end-user devices, topographic routers and communication links interconnecting them is provided. For example, the network 130 described above is provided.

In process 623, a message is transmitted from the source network device to an input router. The input router is the one of the routers 131–138 to which the source network device is directly connected. The message identifies the destination network device by only a destination network address that is conventional, i.e., non-topographic.

For example, the source network device 142 generates the message contained in a message packet having a header that includes a destination network address field and a reply-to address field. The destination network address field contains the destination network address of the destination network device 145 and the reply-to address field contains the conventional network address of the source network device 142. The source network device transmits the message via the communication link 115 to the router 131 to which it is directly connected. The router 131 operates as the input router for the message.

In process 625, in response to the destination network address, the topographic coordinate set of one of the routers of the network associated with the destination network device is provided as a destination coordinate set. When the input router performs direct topographic addressing, the router associated with the destination network device is the router directly connected to the destination network device. For example, the input router 131 provides the topographic coordinate set of the output router 137 as the destination coordinate set when it performs direct topographic addressing.

When the input router performs indirect topographic addressing, the router associated with the destination network device is the router associated with the domain name that forms part of the destination network address. For example, the input route 131 provides the topographic coordinate set of the router 135 as the destination coordinate set when it performs indirect topographic addressing.

In process 627, the destination coordinate set is inserted into the message. For example, the input router 131 creates a destination coordinate set field in an unused portion of the header of the message packet and inserts the destination coordinate set provided for the message into this field. The input router may additionally create a topographic reply-to field in the header and insert its own topographic coordinate set into the topographic reply-to field as a reply-to coordinate set. The advantage of including a reply-to coordinate set in the message will be described below with reference to FIG. 15.

In process 629, in response to the destination coordinate set, the message is routed through the network to the router directly connected to the destination network device.

The destination coordinate set inserted into the message by the input router 131 enables the network 130 to operate in a manner similar to that described above with reference to FIG. 1 and to route the message through the network. Each router through which the message passes uses the destination coordinate set inserted into the message as just described to make an appropriate topographic routing decision.

In an example of the routing performed by the routers of the network 130, the input router 131 uses the destination coordinate set that it has just inserted into the header of the message packet and additionally uses the connected device coordinate sets stored in it to identify the one of its channels to which to send the message packet for onward transmission. The channel identified is that directly connected to one of the topographic network devices that is physically closer to the topographic network device identified by the destination coordinate set than the input router 131. In an embodiment, the channel identified is that directly connected to the topographic network device that is physically closest to the topographic network device identified by the destination coordinate set. In this example, the topographic network device that is physically closest to the topographic network device identified by the destination coordinate set is the router 133. A process similar to that just described is performed by the router 133 and all the other routers through which the message passes on its way to the output router directly connected to the destination network device. The network 130 routes the message directly to the output router when the input router has performed direct topographic addressing, and routes the message to the output router via the domain router when the input router has performed indirect topographic addressing, as described above.

In process 631, in response to the destination network address, the message is transmitted to the destination network device. For example, the router 137 uses the destination network address included in the message to identify the one of its channels connected to the end-user device 145 and forwards the message to that channel for onward transmission to the end-user device 145 via the communication link 123.

When the input router 131 performs direct topographic addressing, described above, the topographic coordinate set of the output router is provided as the destination coordinate set in process 625. For example, when the destination network address in the message is that of the end-user device 145, the input router 131 provides the topographic coordinate set of the output router 137 as the destination coordinate set. The network 130 then operates in response to the destination coordinate set, using the topographic routing scheme described above with reference to FIG. 6, to route the message from the input router directly to the output router. For example, the network operates to route the message from the input router 131 to the output router 137 directly connected to the destination network device 145.

When the input router performs indirect topographic addressing, described above, in process 625, the topographic coordinate set of the domain router associated with the domain name of the destination network address of the message is provided as the destination coordinate set. The network 130 then routes the message to the output router 137 via the domain router 135 using the two-stage routing method 640 that will be described next with reference to FIG. 13, and with additional reference to FIG. 11.

In process 641, the input router that performs indirect topographic addressing inserts the topographic coordinate set of the domain router into the message as the destination coordinate set. The domain router is the router associated with the domain name of the destination network address of the message. Process 641 is an embodiment of process 625 of the method described above with reference to FIG. 12 performed when the input router performs indirect topographic addressing.

In process 643, in response to the destination coordinate set, the message is topographically routed through the network 130 to the domain router. The message is routed using the topographic routing scheme described above with reference to FIG. 6 to route the message to the domain router whose topographic coordinate set is inserted into the message as the destination coordinate set. For example, the network 130 routes the above-described exemplary message to the router 135 when this router is the domain router associated with the domain name included in the destination network address of the message. Usually, the domain router will be different from the router to which the end-user device specified by the destination network address is directly connected, but the domain router may be directly connected to the end-user device specified by the destination network address.

In process 645, in response to the destination network address, the topographic coordinate set of the output router is provided as a new destination coordinate set. The output router is the router directly connected to the destination network device. For example, the domain router 135 includes a topographic translator that uses translation information stored in the domain router and the destination network address included in the message to provide the new destination coordinate set for the message. The translation information stored in the domain router is described above.

In process 647, the new destination coordinate set is inserted into the message. For example, the new destination coordinate set may replace the topographic coordinate set of the domain router in the destination coordinate set field of the message.

In process 649, the message is topographically routed through the network to the output router in response to the new destination coordinate set. For example, the network routes the message using the topographic routing scheme described above with reference to FIG. 6 to the output router. For example the network may route the message to the router 137 directly connected to the end-user device 145.

Figure 12:
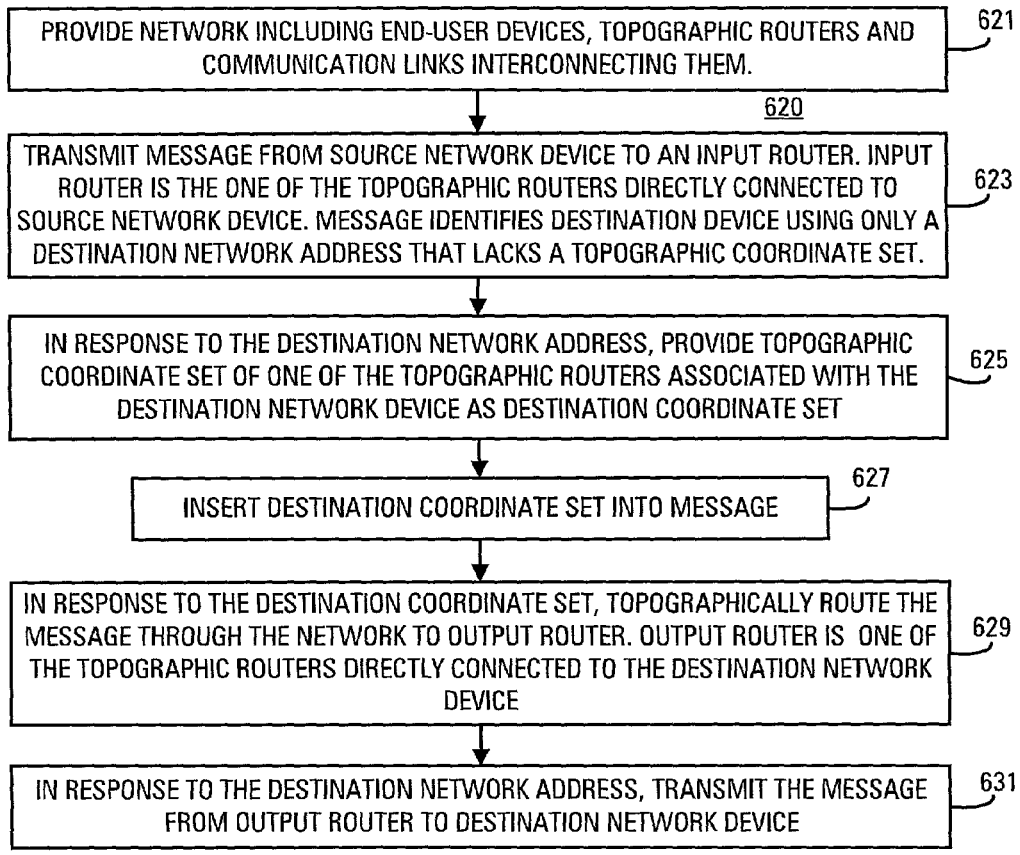
FIG. 12 is a flow chart showing a method for transmitting a message through the network shown in FIG. 11.

Processes 643–649 are an embodiment of process 629 of the method shown in FIG. 12 that are performed when the input router performs indirect topographic addressing.

The above-described process 631 of the method shown in FIG. 12 is then performed to forward the message to the destination network device. For example, the output router 137 forwards the message to the end-user device 145.

As noted above, each of the routers 131–138 of the network 130 may process a received message in one of as many as four different ways, depending whether the router is, with respect to the message, an input router, an output router, an intermediate router or a domain router. To determine its function in processing each message it receives, each router may perform the routine 650. This routine will now be described with reference to FIG. 14.

In process 651, the router receives the message.

In process 653, a test is performed to determine whether the message includes a destination coordinate set. For example, router may determine whether the message includes a destination coordinate set field and, if so, whether the field contains a valid destination coordinate set. A test result of NO indicates that the router is operating as the input router for the message, and execution branches to process 655.

In process 655 a destination coordinate set for the message is provided.

In process 657, the destination coordinate set is inserted into the message.

In process 659, the routing of the message is determined topographically using the destination coordinate set in the message. For example, the router may operate in response to the destination coordinate set to identify the one of its channels to which to forward the message, as described above.

In process 661, the message is transmitted. For example, the message is forwarded to the channel identified in process 659 and is transmitted to the topographic network device connected to the identified channel via the communication link that extends from the router to the topographic network device.

A test result of YES in process 653 causes execution to advance to process 663.

In process 663, a test is performed to determine whether the destination coordinate set (DESTINATION COORDINATE SET) included in the message is equal to the topographic coordinate set (TOPOGRAPHIC COORDINATE SET) of the router. A NO result indicates that the router is operating as an intermediate network device in the topographic routing between the input router and the output router, as described above with reference to FIG. 6. Execution branches to processes 659 and 661 where the topographic routing of the message is determined using the destination coordinate set included in the message and the message is transmitted.

A YES result in process 663 indicates that the router is operating as either the domain router or the output router for the message. In this case, execution advances to process 665.

In process 665, a test is performed to determine whether the destination network device is directly connected to the router. For example, the router may determine whether the destination network address included in the message is equal to the conventional network address of any one of the end-user devices directly connected to it. As noted above, each router of the network 130 keeps a record of the conventional network addresses of the end-user devices directly connected to it.

A NO result in process 665 indicates that the router is operating as the domain router for the message. In this case, execution branches to processes 655, 657, 659 and 661, described above. For example, these processes would be performed by the router 135 operating as the domain router for the end-user device 145. In process 655, the destination coordinate set provided for the message is the new destination coordinate set, i.e., the topographic coordinate set of the output router.

A YES result in process 665 indicates that the router is operating as the output router for the message. Execution advances to processes 667 and 661. In process 667, the destination network address is used to determine the routing of the message and, in process 661, the message is transmitted. For example, in process 667, the router 137, operating as the output router, may use the destination network address to identify the one of its channels directly connected to the destination network device 145. Then, in process 661, the router 137 may forward the message to the identified channel for transmission to the destination network device 145.

Figure 13:
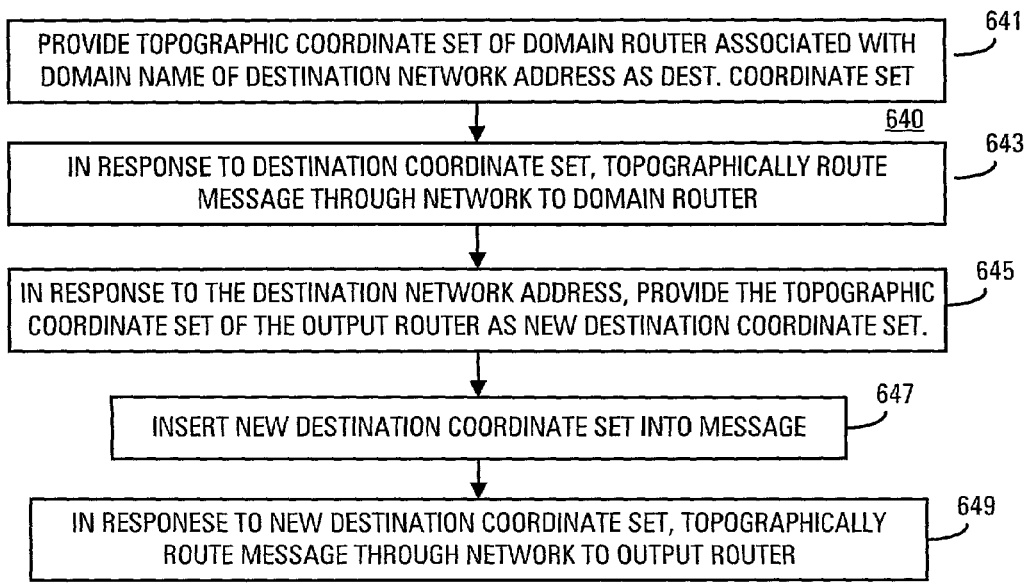
FIG. 13 is a flow chart showing a two-stage routing method according to the invention.

An example of the operation of the routine 650 in various ones of the routers of the network 130 will now be described with reference to FIG. 14, and with additional reference to FIGS. 11–13 as indicated below. In the example, a message is transmitted from source network device 142 to destination network device 145. The router 131, operating as the input router, performs processes 651 and 653 as an embodiment of process 623, processes 655 and 657 as embodiments of processes 625 and 627, respectively, and processes 659 and 661 as an embodiment of process 629. Processes 623, 625, 627 and 629 are described above with reference to FIG. 12. Router 133, operating as an intermediate network device, performs processes 651, 653, 663, 659 and 661. When the input router 131 has performed indirect topographic addressing, the router 135, operating as the domain router associated with the domain name included in the conventional network address of destination network device 145, performs processes 651, 653, 663 and 665 as an embodiment of process 643, processes 655 and 657 as embodiments of processes 645 and 647, respectively, and processes 659 and 661 as an embodiment of process 649. Processes 643, 645, 647 and 649 are described above with reference to FIG. 13. Router 137, operating as the output router, performs processes 651, 653, 663 and 665 and processes 667 and 661 as an embodiment of process 631 described above with reference to FIG. 12.

Figure 14:
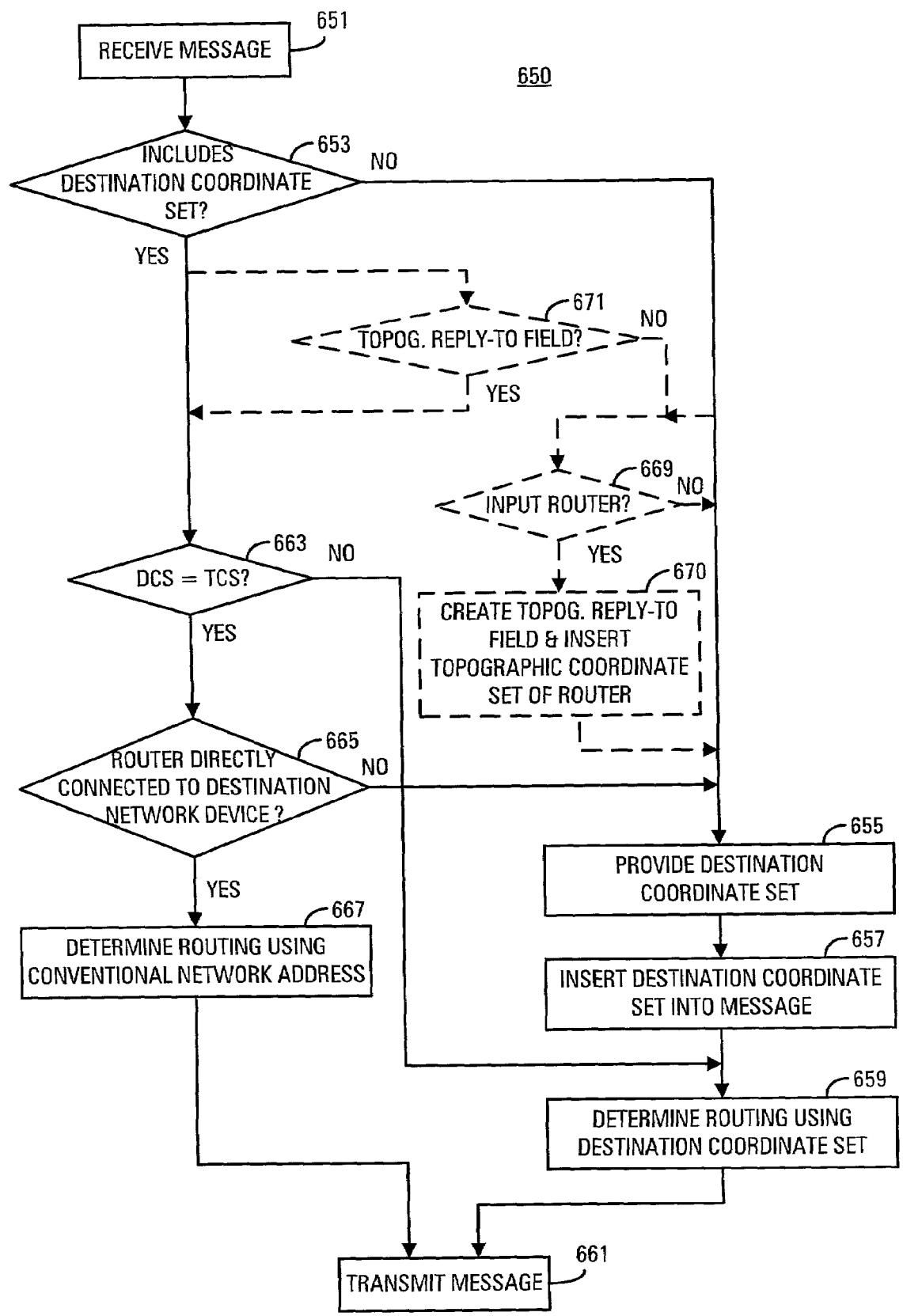
FIG. 14 is a flow chart showing a method by which a router in the network shown in FIG. 11 determines its function in processing a message it receives.

It should be noted that, in the routine 650 shown in FIG. 14, the processes 655 and 665 require longer to perform than the remaining processes since they involve looking up information. However, in each execution of the routine 650, only one of the processes 655 and 665 is performed, and the process is performed only once. This minimizes the delay imposed on the message by each router. Moreover, neither of these processes is performed when the router operates as an intermediate router. In many cases, most of the routers through which the message passes operate as intermediate routers.

FIG. 14 also shows the optional processes 669, 670 and 671. Process 669 may be performed when process 653 determines that the message lacks a destination coordinate set. In process 669, a test is performed on the reply-to address in the conventional reply-to field of the message. The test determines whether the network device identified by the reply-to address is directly connected to the router, i.e., whether the router is the input router for the message. A test result of NO causes execution to branch to process 655, bypassing process 670. A test result of YES causes execution to advance to process 670.

In process 670, a topographic reply-to field is created in the message, if none exists, and the topographic coordinate set of the router is inserted into the topographic reply-to field as a reply-to coordinate set. Execution then advances to process 655, described above.

The test in process 669 allows the router to insert its topographic coordinate set into the topographic reply-to field of the message only when the router is operating as the input router for the message. Allowing the router to insert its topographic coordinate set into the topographic reply-to field of a message when it is not the input router for the message would cause the network 130 to route any reply message to the wrong router.

Optional process 671 is performed when process 653 returns a YES result. In process 671, a test is performed to determine whether the message includes a valid topographic reply-to field. When a YES result is obtained, execution advances to process 663, described above. When a NO result is obtained, execution branches to process 669, also described above.

In the examples described above, the destination coordinate set is described as being provided by and inserted into the message by the input router or the domain router. However, this is not critical to the invention. A server configured to perform these functions may be connected to the router as an end-user device. In this case, a NO result in either process 653 or 665 causes the router to forward the message to the one of its channels connected to the server. The server provides the destination coordinate set for the message, inserts the destination coordinate set into the message and returns the message to the router. Upon receiving the message returned by the server, the router performs processes 651, 653 and 663, obtaining a YES result at process 653 and a NO result at process 663. Consequently, the router acts as an intermediate router, and additionally performs processes 659 and 661 to route the message through the network 130.

The routing efficiency of the network 130 just described can be increased by changing the network-related software running on the non-topographic end-user devices. Such software includes, but is not limited to, e-mail software, instant messenger software, network game software and web browser software. The change enables a reply message responding to an original message transmitted by a source network device to be directly topographically addressed to the source network device regardless of whether the original message was directly or indirectly topographically addressed to the destination end-user device.

As noted above, an embodiment of the routers of the network 130, when operating as the input router for a message, creates a topographic reply-to field in the header of each message packet and inserts the topographic coordinate set of the input router into this field as a reply-to coordinate set. Thus, a message transmitted by such an input router includes a topographic reply-to field containing the topographic coordinate set of the input router when the message is received by the destination network device.

The modified network-related software causes the destination network device to generate a reply message in response to an original message received with a valid topographic reply-to field to include a destination coordinate set field and to copy the contents of the topographic reply-to field of the original message into the destination coordinate set field of the reply message. The reply message is additionally generated to include at least a destination network address field into which is copied the conventional network address included in the reply-to address field of the original message. This conventional network address is that of the source network device, i.e., the network device to which the reply message is addressed.

Figure 15:
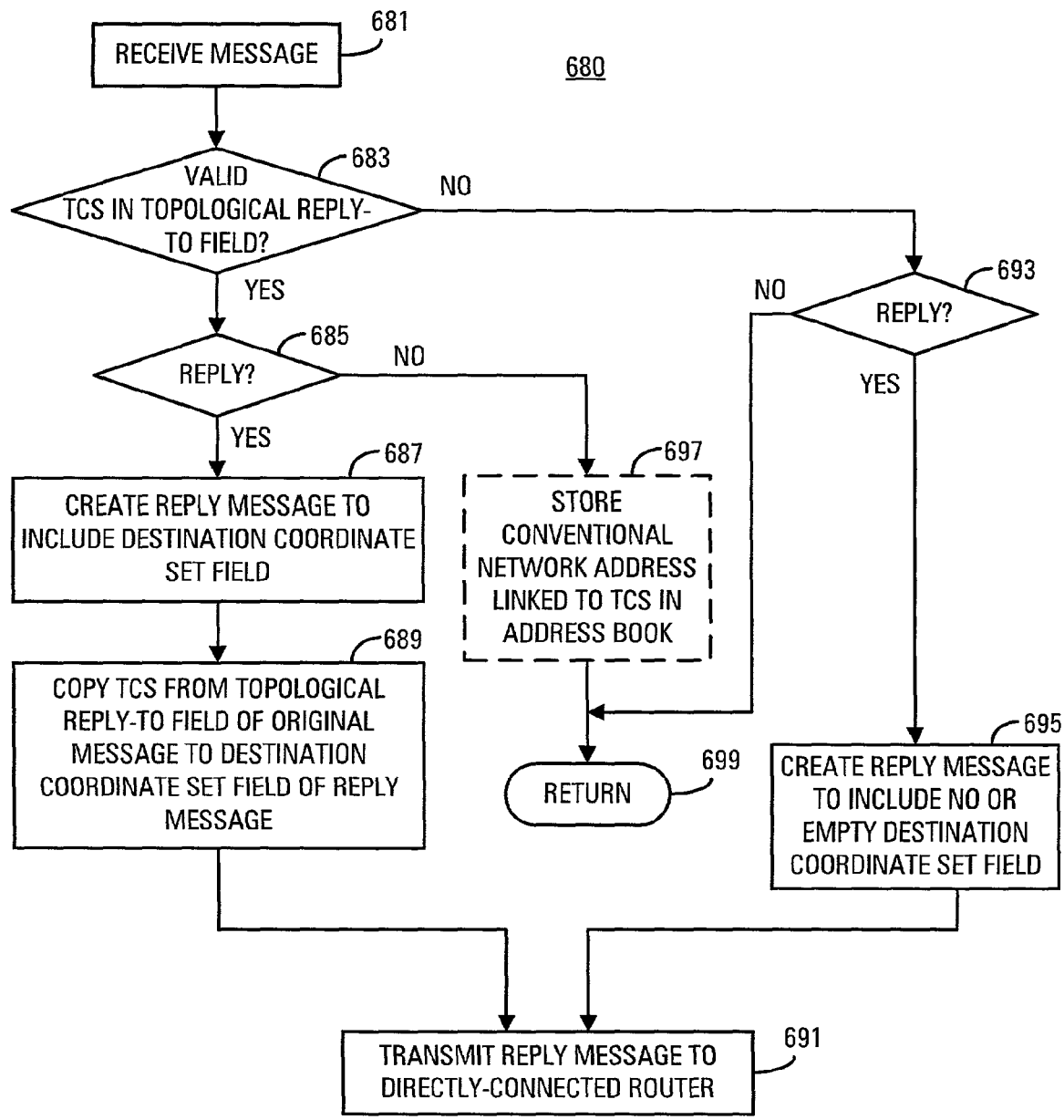
FIG. 15 is a flow chart showing the method performed by an end-user device in the network shown in FIG. 11 in response to the network-related software according to the invention.

The modified network-related software performs the routine 680 shown in FIG. 15.

In process 681, the destination network device receives the original message.

In process 683, a test is performed to determine whether the original message includes a topographic reply-to field containing a valid topographic coordinate set. A YES result causes execution to advance to process 685.

In process 685, a test is performed to determine whether a reply message is to be generated in response to the original message. A YES result causes execution to advance to process 687.

In process 687, the reply message is created to include a destination coordinate set field. A topographic reply-to field may also be created.

In process 689, the contents of the topographic reply-to field of the original message are copied into the destination coordinate set field of the reply message.

In process 691, the destination network device transmits the reply message to the router directly connected to it.

A NO result in process 683 causes execution to branch to process 693, where a test is performed to determine whether a reply message is to be generated in response to the original message. A YES result causes execution to advance to process 695.

In process 695, a reply message with no destination coordinate set field, with a blank destination coordinate field or with a destination coordinate field that contains an invalid argument is created. Execution then advances to process 691, described above.

A NO result in process 693 causes execution to branch to process 699, where execution ends.

A NO result in process 685 causes execution to branch to process 699 via optional process 697.

In process 697, the conventional network address and the topographic coordinate set are respectively copied from the conventional reply-to field and the topographic reply-to field of the original message and are stored in linked fields of an address book resident in the end-user device constituting the destination network device. Process 697 may alternatively be performed between processes 683 and 685. Process 697 captures the relationship between the conventional network address of the source network device and the topographic coordinate set of the router directly connected to the source network device. Performing process 697 enables the destination network device at any time to generate a message that includes the topographic coordinate set of the source network device as a destination coordinate set simply by inputting the conventional network address of the source network device into the address book.

In processes 685 and 693, a NO result may be generated, for example, by the user declining to reply to the original message within a predetermined time, or by the user deleting the original message without replying to it.

In process 687, a destination network address field, a reply-to address field and a topographic reply-to field may also be created in the reply message, and in process 689, the conventional network address may be copied from the reply-to address field of the original message to the destination network address field of the reply message, and the destination network device may insert its own conventional network address into the reply-to address field of the reply message. The topographic reply-to field is left blank: when the reply message is received by the router directly connected to the destination network device, this router will insert its topographic coordinate set into this field as a reply-to coordinate set.

In the following descriptions, the appellations source network device and destination network device as applied to the original message will be used unchanged as applied to the reply message. The reply message is transmitted from the destination network device to the source network device. In process 691, the destination network device transmits the reply message to the router directly connected to it. For example, the end-user device 145, as the destination network device transmits the reply message to the router 137. The message includes the topographic coordinate set of the router directly connected to the source network device as a destination coordinate set. For example, the message includes the topographic coordinate set of the router 131 directly connected to the source network device 142.

The router 137 directly connected to the destination network device 145 operates as an intermediate network device in response to the destination coordinate set in the reply message and forwards the reply message to another topographic network device of the network 130. For example, the router 137 may forward the reply message to the router 133, which may in turn forward the reply message to the router 131 directly connected to the source network device 142. When the router 131 receives the reply message, it operates as an output router and forwards the reply message to the source network device in response to the conventional network address also included in the reply message, as described above.

Modifying the network-related software to copy the topographic coordinate set of the input router of the original message from the topographic reply-to field of the original message to the destination coordinate set field of the reply message enables the network 130 to route the reply message topographically from the router 137 directly connected to the destination network device to the router 131 directly connected to the source network device. In particular, even when the original message has been routed to the destination network device 145 using indirect topological addressing, the reply message is returned to the source network device 142 by direct topological addressing. The reply message may be, for example, composed of many web pages transmitted by the destination network device 145 in response to the original message.

The modified network-related software can be conveyed to the end-user devices on which it is to run by embodying the program in a suitable computer-readable medium, such as a set of floppy disks, a CD-ROM, a DVD-ROM, a non-volatile memory or could be transmitted to such end-user device by a suitable communication link, such as one of the communication links of the network 130.

Figure 16:
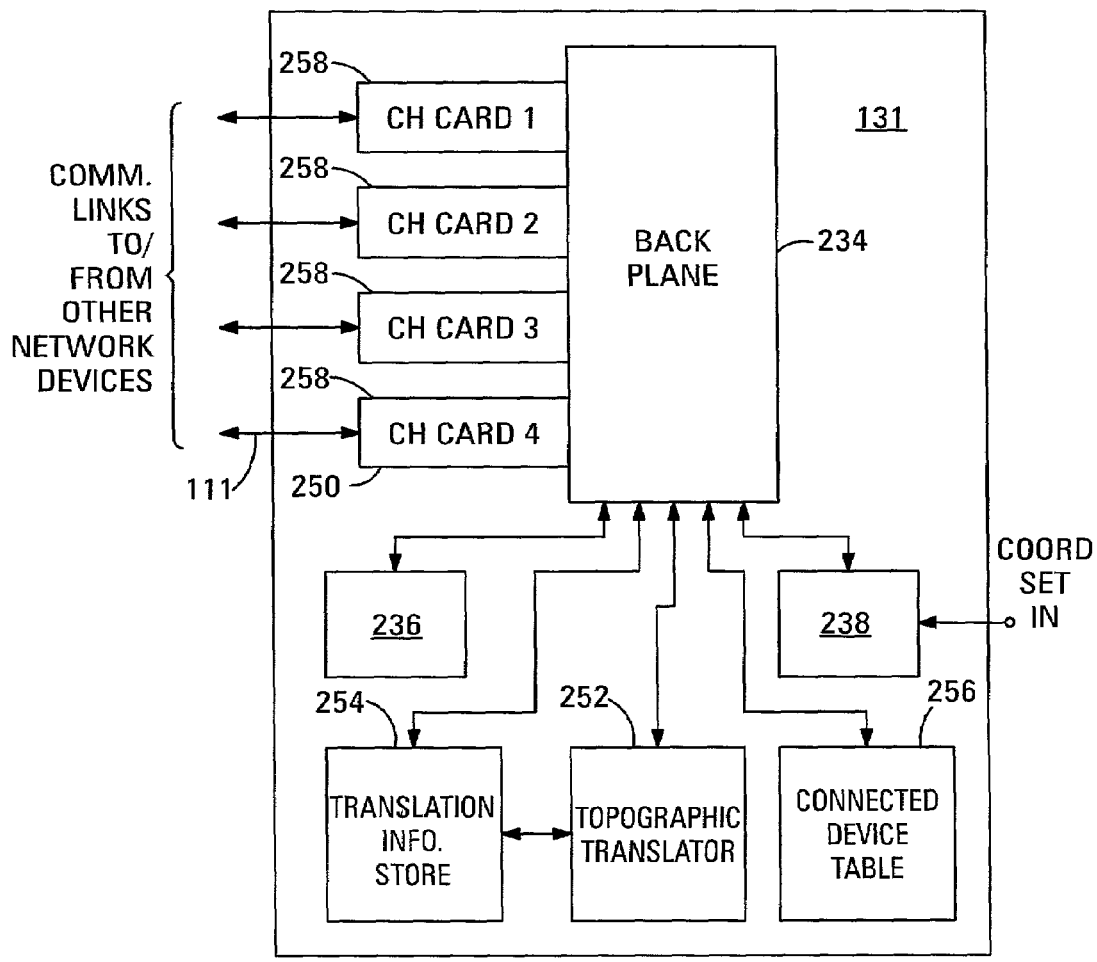
FIG. 16 is a block diagram of an exemplary embodiment of a topographic router according to the invention of the network shown in FIG. 11.

FIG. 16 is a block diagram showing an embodiment of a topographic router according to the invention suitable for use in the network 130. The router 131 will be described as an example of the routers 131–138 of the network 130. Elements of the router 131 that correspond to elements of the router 101 described above with reference to FIG. 2 are indicated using the same reference numerals and will not be described again here.

The router 131 additionally includes the topographic translator 252, the translation information store 254 and the connected device table 256. The topographic translator is connected to the back plane 234. The topographic information store is connected to the backplane and to the topographic translator and stores translation information. In an embodiment, the topographic translator, the topographic information store and the connected device table are each configured to appear to the back plane as a channel of the router 131

A router that performs direct topographic addressing when operating as an input router stores translation information composed of the conventional network address of each end-user device of the network 130 linked to the topographic coordinate set of the output router of the end-user device, i.e., the router to which the end-user device is directly connected. A router that performs indirect topographic routing stores translation information composed of each domain name in the conventional network addresses of the end-user devices of the network linked to the topographic coordinate set of the domain router associated with the domain name.

A router that performs direct topographic addressing in response to some destination network addresses and indirect topographic addressing in response to all other destination network addresses stores two different sets of translation information. One set is composed of each conventional network address on which the router performs direct topographic addressing linked to the topographic coordinate set of the router to which the corresponding end-user device is directly connected. The other set is composed of each domain name in the conventional network addresses on which indirect topographic addressing is performed linked to the topographic coordinate set of the domain router associated with the domain name.

A router that can operate as a domain router stores translation information composed of the conventional network address for each end-user device having, as part of its conventional network address, the domain name with which the domain router is associated. The conventional network address of each end-user device having the domain name is linked to the topographic coordinate set of the output router of the end-user device, i.e., the router to which the end-user device is directly connected. A router that operates both as a domain router and an input router stores translation information relating to both of its functions.

The connected device table 256 stores the connected device information composed of the conventional network address of each end-user device directly connected to the router 131 linked to the address of the channel of the router to which the end-user device is directly connected.

Both the translation information store 254 and the connected device table 256 are shown connected to the back plane 234. Each may have a structure similar to the coordinate store 236 shown in FIG. 2 to enable them to receive the translation information and connected device information from the network 130 via a channel of the router 131 and the back plane 234. Such a structure enables especially the translation information stored in all the routers 131–138 to be centrally updated by a network controller (not shown) configured as an end-user of the network. Either or both of the translation information and the connected device information may alternatively be provided to the router 131 locally, either via one of its channel cards or via at least one separate input (not shown) provided for this purpose.

Figure 17:
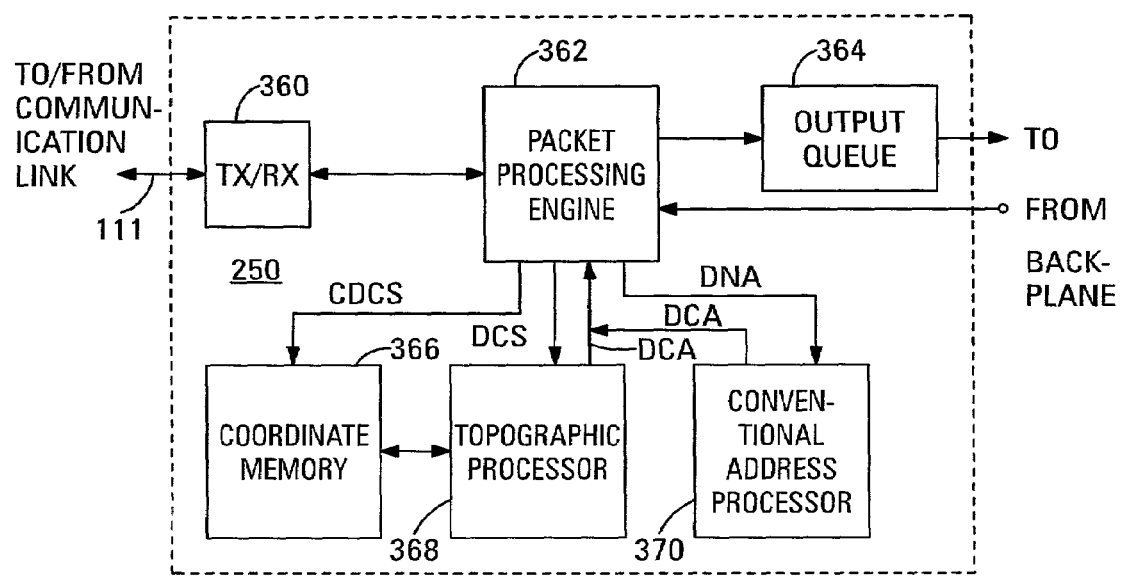
FIG. 17 is a block diagram of an exemplary embodiment of one of the channel cards of the router shown in FIG. 16.

The channel cards 258 of the router 131 are structured similarly to the channel cards 232 of the router 101 shown in FIG. 2. FIG. 17 shows the structure of the channel card 250 as an example of the channel cards 258. The other channel cards are similarly structured. Elements of the channel card 250 that correspond to elements of the channel card 240 described above with reference to FIG. 3 are indicated using the same reference numerals and will not be described again here.

The channel card 250 additionally includes the conventional address processor 370. The conventional address processor is connected to the packet processing engine 362. The conventional address processor receives via the packet processing engine a copy of the connected device information stored in the connected device table 256 (FIG. 16). In response to receiving a destination network address DNA from the packet processing engine, the conventional address processor returns a corresponding destination channel address DCA. The destination channel address is the address of the channel of the router to which the end-user device indicated by the conventional network address is directly connected.

The channel card 250 performs the routine 650 described above with reference to FIG. 14. Operation of the channel card in performing this routine will now be described with reference to the routine shown in FIG. 14, the router block diagram shown in FIG. 16 and channel card block diagram shown in FIG. 17.

In process 651, the transmitter/receiver 360 receives a message. In an example, the message is contained in a message packet having a header that includes a destination network address and a reply-to address both composed of conventional network addresses. The message may additionally include a destination coordinate set and a reply-to coordinate set.

In process 651, the transmitter/receiver 360 receives the message and forwards it to the packet processing engine 362.

In process 653, the packet processing engine 362 caches the message and determines whether the header of the message packet includes a destination coordinate set. Execution branches depending on the result of the determination.

In process 655, the packet processing engine 362 packages a copy of the destination network address in the header of the message packet in an envelope and sends the envelope to the back plane 234. The envelope is addressed to the topographic translator 252. The back plane forwards the envelope to the topographic translator.

Using the destination network address received from the packet processing engine and the translation information stored in the translation information store 254, the topographic translator provides the destination coordinate set for the message, as described above. The destination coordinate set provided depends on whether the translation information is for direct or indirect topographic addressing, as described above. The topographic translator packages the destination coordinate set in an envelope addressed to the channel 250 from which the destination network address copy was received, and sends the envelope to the back plane 234. The back plane forwards the envelope to the channel 250.

In process 657, the packet processing engine 362 creates a destination coordinate set field in the header of the message packet, if none already exists, and inserts the destination coordinate set received from the topographic translator 252 into the destination coordinate set field.

In process 659, the packet processing engine 362 sends a copy of the destination coordinate set DESTINATION COORDINATE SET included in header of the message to the topographic processor 368. In response to the destination coordinate set and the connected device coordinate sets stored in the coordinate memory 366, the topographic processor returns a destination channel address DCA to the packet processing engine. The destination channel address is the address of the channel of the router 131 to which the message is to be forwarded.

In process 661, the packet processing engine 362 packages the message in one or more envelopes addressed with the destination channel address DCA and places the message in the output queue 364 for sending to the back plane 234. The back plane forwards the envelopes to the channel identified by the destination channel address, the receiving channel. In the receiving channel, the packet processing engine receives the envelopes from the back plane, removes the message packets from their envelopes and feeds the message packets to the transmitter/receiver. The transmitter/receiver transmits the message to the network device connected to the receiving channel as described above.

In process 663, the packet processing engine 362 compares the destination coordinate set DESTINATION COORDINATE SET included in the header of the message packet and the topographic coordinate set of the router. The packet processing engine may obtain the topographic coordinate set of the router from the coordinate store 238. Execution of the routine branches depending on the result of the comparison, as described above.

In process 665, the packet processing engine 362 sends a copy of the destination network address DNA included in header of the message to the conventional address processor 370. The conventional address processor compares the destination network address of the message with the conventional network addresses stored in it. The conventional network addresses stored in the conventional address processor are those of the end-user devices directly connected to the router 131. When the conventional address processor detects no match between the destination network address and the conventional network addresses of the directly-connected network devices, it returns a "not found" code to the packet processing engine. The "not found" code causes the routine 650 to branch to process 659, as described above.

Process 667 is executed when the conventional address processor 370 detects a match between the destination network address and one of the conventional network addresses of the directly-connected network devices. The match causes the conventional network address processor to return a destination channel address DCA to the packet processing engine 362. Process 661 is then performed as described above.

The packet processing engine 362 may additionally perform process 669 to create a topographic reply-to field in the header, if none already exists, and to insert the topographic coordinate set of the router 131 into this field as a reply-to coordinate set. The packet processing engine may obtain the topographic coordinate set from the coordinate input 238. When the message includes a destination coordinate set, the packet processing engine may additionally perform process 671, followed by process 669 when the message lacks a topographic reply-to field, prior to performing process 663.

In process 655, the packet processing engine 362 may send a copy of the entire header of the message packet to the topographic translator 252. The topographic translator reads the destination network address included in the header copy and, in response to the destination network address, provides the destination coordinate set DESTINATION COORDINATE SET for the message. In this case, the topographic translator additionally performs process 657 to insert the destination coordinate set into the header, and then returns the modified header to the channel from which the original header was received. In the channel, the packet processing engine replaces the original header with the header received from the topographic translator. The topographic translator may additionally create a topographic reply-to field in the header and insert the topographic coordinate set of the router 131 into this field as a reply-to coordinate set, as described above.

As a further alternative, the topographic translator 252 and translation information store 254 may be omitted from the router 131 and may instead be located in a topographic translation device external of the router. The topographic translation device is configured as an end-user device and is directly connected to the router. FIG. 11 shows the topographic translation device 141 connected as an end-user device to the router 135.

When the topographic translator 252 and translation information store 254 are located in an external topographic translation device, and the packet processing engine 362 determines in process 653 that the message lacks a destination coordinate set or determines in process 665 that the router is not directly connected to the destination network device, the packet processing engine packages the message in envelopes addressed to the channel of the router directly connected to the topographic translation device. The topographic translation device performs processes 665 and 667 and returns the message to the router. The message returned to the router includes a destination coordinate set in the destination coordinate set field of the header of each packet.

The channel of the router 131 that receives the message returned from the topographic translation device (not shown) processes the message as a received message, again using the routine 650 shown in FIG. 14. The message generates a YES result in process 653 and a NO result in process 663. Accordingly, execution branches to process 659, where the router determines a topographical routing for the message using the destination coordinate set inserted into the message by the topographic translation device, and to process 661, where the router transmits the message in accordance with the topological routing.

As a yet-further alternative, each of the channel cards 258 may include a topographic translator similar to the topographic translator 252 and store that stores at least a subset of the translation information stored in the translation information store 254. In this case, the topographic translator 252 and at least part of the translation information store 254 are omitted from the router 131. This structure reduces traffic through the back plane 234.

The above-described topographic network devices of the network according to the invention may be constructed from discrete components, small-scale or large-scale integrated circuits, suitably-configured ASICs, PLAs and other suitable hardware. Alternatively, the topographic network devices may be constructed at least in part using an application-specific integrated circuit, digital signal processor, microprocessor, microcomputer or computer with internal or external memory operating in response to a program fixed in a computer-readable medium. In computer-, DSP- and ASIC-based embodiments, the various circuit elements shown herein may be ephemeral, and may only exist temporarily as the program executes. In such embodiments, the program can be conveyed to the hardware on which it is to run by embodying the program in a suitable computer-readable medium, such as a set of floppy disks, a CD-ROM, a DVD-ROM, a read-only memory or could be transmitted to such hardware by a suitable communication link.

The communication links of the above-described networks according to the invention may be wired or wireless electrical communication links, optical communication links or other suitable communication links.

Although this disclosure describes illustrative embodiments of the invention in detail, it is to be understood that the invention is not limited to the precise embodiments described, and that various modifications may be practiced within the scope of the invention defined by the appended claims.

We claim:

1. A network for communicating a message, the network comprising topographic network devices and communication links interconnecting the topographic network devices, the topographic network devices each having a physical location represented by a topographic coordinate set and having a network address that includes the topographic coordinate set.

2. The network of claim 1, additionally comprising a global positioning system receiver at least temporarily connected to ones of the topographic network devices to supply the topographic coordinate set thereto.

3. The network of claim 1, in which each of the topographic network devices is connected to at least one other of the topographic network devices and includes means for transmitting its topographic coordinate set to the at least one other of the topographic network devices.

4. The network of claim 1, in which each of the topographic network devices is connected to at least one other of the topographic network devices and includes means for receiving a topographic coordinate set from each of the at least one other of the topographic network devices.

5. The network of claim 1, in which ones of the topographic network devices capable of originating the message for transmittal through the network to another of the topographic network devices as a destination network device each include a topographic addressing engine that operates to include the topographic coordinate set of the destination network device in the message.

6. The network of claim 1, in which:
the message includes the topographic coordinate set of a destination network device as a destination coordinate set, the destination network device being one of the topographic network devices; and
a one of the topographic network devices as an intermediate network device, upon receiving the message, operates to route the message to another of the topographic network devices, the other of the network devices being physically closer to the destination network device than the intermediate topographic network device.

7. The network of claim 1, in which the network addresses of ones of the topographic network devices having substantially coincident physical locations each include an additional numeric data field.

8. The network of claim 1, additionally comprising additional network devices and additional communication links, the additional communication links connecting the additional network devices to ones of the topographic network devices, the additional network devices having conventional network addresses lacking topographic coordinate sets.

9. The network of claim 8, in which:
ones of the additional network devices each operate to generate the message addressed to a destination network device identified by a destination network address, the destination network address lacking a topographic coordinate set; and
ones of the topographic network devices each include a topographic translator that operates in response to the destination network address of the message to provide the topographic coordinate set of another of the topographic network devices as a destination coordinate set for the message, the other of the routers being associated with the destination network device.

10. The network of claim 9, in which the other of the topographic network devices is associated with the destination network device by being directly connected thereto.

11. The network of claim 9, in which:
the destination network address includes a domain name; and
the other of the topographic network devices is associated with the destination network device by being associated with the domain name included in the destination network address.

12. The network of claim 11, in which the other of the topographic network devices operates to receive the message and to provide a new destination coordinate set for the message, the new destination coordinate set being the topographic coordinate set of an output one of the topographic network devices to which the destination network device is directly connected.

13. The network of claim 1, in which:
the message includes a destination coordinate set, the destination coordinate set being the topographic coordinate set of a destination network device, the destination network device being one of the topographic network devices;
the network includes regions, each of the regions comprising at least one regional network device, the regional network device being one of the topographic network devices, the regional network devices of the regions being interconnected by high-capacity communication links, the high-capacity communication links being high-capacity ones of the communication links;
the topographic network devices in each one of the regions each include additional topographic information indicating the topographic coordinate set of the regional network device of the one of the regions and a topographic extent of at least some of the regions; and
a one of the topographic network devices, upon receiving the message, operates in response to the destination coordinate set and the additional topographic information to route the message to the regional network device when the additional topographic information indicates that the destination network device is located in another of the regions.

14. The network of claim 13, in which the regional network device operates in response to the destination coordinate set and the additional topographic information stored therein to route the message to the regional network device of the region in which the destination network device is located.

15. The network of claim 1, in which the topographic coordinate set comprises a latitude and a longitude.

16. A topographic network device for operation in a network including topographic devices in which each of the topographic network devices has a physical location represented by a topographic coordinate set, in which each of the topographic network devices additionally has a network address that includes the topographic coordinate set, and in which a message configured for transmission through the network includes a destination coordinate set, the destination network set being the topographic coordinate set of a destination network device, the destination network device being one of the topographic network devices, the topographic network device comprising:
channels each configured for connection via a communication link to another of the topographic network devices, the channels including a first channel via which the message is received;
a coordinate store for storing connected device coordinate sets, the connected device coordinate sets being the topographic coordinate sets of the topographic network devices to which the channels are directly connected; and
a topographic processor that operates in response to the connected device coordinate sets stored in the coordinate store and the destination coordinate set of the message to identify a second channel to which to forward the message, the second channel being another of the channels.

17. The topographic network device of claim 16, in which the second channel is the one of the channels connected to another of the topographic network devices that is physically closer to the destination network device than the network device.

18. The topographic network device of claim 16, in which the coordinate store is configured to store, as connected device coordinate sets, topographic coordinate sets received from ones of the topographic network devices directly connected to the channels of the network device.

19. The topographic network device of claim 16, in which:
the coordinate store is additionally configured to store at least one of (a) device-type information and (b) additional topographic information for the ones of the topographic network devices directly connected to the network device; and
the topographic processor additionally operates in response to at least one of the device-type information and the additional topographic information to identify the second channel.

20. The topographic network device of claim 16, in which:
the coordinate store is additionally configured to store additional topographic information relating to the network; and
the topographic processor operates in response to the additional topographic information in lieu of the destination coordinate set of the message to identify the second channel.

21. The topographic network device of claim 20, in which the topographic processor operates in response to the additional topographic information to identify, as the second channel, a one of the channels connected at least indirectly to one of the communication links at least one of (a) having a higher transmission capacity, and (b) carrying less pre-existing network traffic.

22. The topographic network device of claim 20, in which:
the network includes regions, each of the regions comprising at least one regional network device, the regional network device being one of the topographic network devices, the regional network devices of the regions being interconnected by high-capacity communication links, the high-capacity communication links being high-capacity ones of the communication links; and
the topographic processor operates in response to the additional topographic information to identify, as the second channel, a one of the channels connected to the regional network device of the region in which the topographic network device is located.

23. The topographic network device of claim 16, in which:
the network additionally comprises additional network devices and additional communication links, the additional communication links connecting the additional network devices to ones of the topographic network devices, the additional network devices having conventional network addresses lacking topographic coordinate sets, the additional network devices including a destination network device;
the message includes, instead of the destination coordinate set, a destination network address identifying the destination network device, the destination network address lacking a topographic coordinate set;
the topographic network device additionally comprises a topographic translator that operates on receipt of the message and in response to the destination network address to provide the topographic coordinate set of another of the topographic network devices as the destination coordinate set for the message, and
the topographic processor operates in response to the destination coordinate set provided by the topographic translator.

24. The topographic network device of claim 23, additionally comprising a packet processing engine that operates to inhibit operation of the topographic translator when it detects a destination coordinate set extant in the received message.

25. The topographic network device of claim 23, additionally comprising:
a packet processing engine that operates to detect a destination coordinate set in the message and, when it detects the destination coordinate set, to determine whether the destination coordinate set is equal to the topographic coordinate set of the topographic network device; and
a conventional address processor that, when the packet processing engine determines that the destination coordinate set is equal to the topographic coordinate set of the topographic network device, operates in response to the destination network address to identify the second channel.

26. The topographic network device of claim 23, additionally comprising a packet processing engine that operates to insert the topographic coordinate set of the topographic network device into the message as a reply-to coordinate set.

27. A computer-readable medium in which is fixed a computer program that instructs a computer to perform a topographic network message addressing method, the addressing method comprising:
receiving an original message;
determining whether a valid topographic reply-to field exists in the original message, the valid topographical reply-to field including a topographic coordinate set; and
when the valid topographic reply-to field exists in the original message:
in response to the original message, creating a reply message to include a destination coordinate set field, and
copying the topographic coordinate set from the topographic reply-to field of the original message to the destination coordinate set field of the reply message.

28. The computer-readable medium of claim 27, in which:
the original message additionally comprises a reply-to address, the reply-to address lacking a topographic coordinate set; and
the addressing method additionally comprises storing the topographic coordinate set linked to the reply-to address.

29. The computer-readable medium of claim 27, in which:
the original message additionally comprises a reply-to address, the reply-to address lacking a topographic coordinate set;
in creating the reply message, the reply message is created additionally to include a destination network address field; and
the addressing method additionally comprises copying the reply-to address from the original message to the destination network address field of the reply message.

30. A communication network, comprising:
a destination network device having a destination address that includes a first topographic coordinate set; and
a source network device configured to generate a message comprising a packet having a header; the header containing the destination address of the destination network device.

31. The communication network of claim 30, wherein the source network device has a source address that includes a second topographic coordinate set; and the source network device is further configured to insert the source address into the header of the message.

32. The communication network of claim 30, wherein the first topographic coordinate set comprises a first latitude and a first longitude.

33. The communication network of claim 30, further comprising a directly-connected network device that is directly connected to the source network device.

34. The communication network of claim 33, wherein the directly-connected network device is a router containing a look-up table comprising a plurality of device coordinate sets; each of the plurality of device coordinate sets comprising a topographic coordinate set of each of a plurality of network devices that are directly connected to the router.

35. The communication network of claim 34, further comprising a global positioning system receiver at least temporarily connected to one of a) the source network device b) the destination network device and c) the directly-connected device.

36. The communication network of claim 30, wherein the first topographic coordinate set comprises a Cartesian coordinate set.

37. The communication network of claim 36, wherein the Cartesian coordinate set is a three-dimensional Cartesian coordinate set.

* * * * *